(12) United States Patent
Nataraj et al.

(10) Patent No.: US 10,904,096 B2
(45) Date of Patent: Jan. 26, 2021

(54) DEEP NETWORK PATH ANALYSIS FOR IDENTIFYING NETWORK SEGMENTS AFFECTING APPLICATION PERFORMANCE

(71) Applicant: Cisco Technology, Inc., San Jose, CA (US)

(72) Inventors: Harish Nataraj, Berkeley, CA (US); Ajay Chandel, Fremont, CA (US); Prakash Kaligotla, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 70 days.

(21) Appl. No.: 16/229,663

(22) Filed: Dec. 21, 2018

(65) Prior Publication Data
US 2020/0204448 A1    Jun. 25, 2020

(51) Int. Cl.
*H04L 12/24* (2006.01)
*H04L 12/803* (2013.01)
*H04L 12/26* (2006.01)
*H04L 12/801* (2013.01)

(52) U.S. Cl.
CPC ............. *H04L 41/12* (2013.01); *H04L 41/22* (2013.01); *H04L 43/04* (2013.01); *H04L 43/0852* (2013.01); *H04L 43/10* (2013.01); *H04L 47/125* (2013.01); *H04L 47/193* (2013.01)

(58) Field of Classification Search
None
See application file for complete search history.

(56) References Cited

U.S. PATENT DOCUMENTS

| | | | | |
|---|---|---|---|---|
| 6,502,125 B1 * | 12/2002 | Kenner | ................... | H04L 29/06 709/203 |
| 6,745,242 B1 * | 6/2004 | Schick | ................ | H04L 41/5003 709/224 |
| 7,792,045 B1 * | 9/2010 | Vijendra | ................. | H04L 41/14 370/216 |
| 2002/0161755 A1 * | 10/2002 | Moriarty | ............. | H04L 63/1441 |

(Continued)

OTHER PUBLICATIONS

U.S. Appl. No. 15/800,061, filed Oct. 2017, Nataraj.

*Primary Examiner* — Scott B Christensen
(74) *Attorney, Agent, or Firm* — Behmke Innovation Group; James M. Behmke; Jonathon P. Western

(57) ABSTRACT

In one embodiment, a network analysis process initiates network path analysis for a transaction application operating over a logical transaction path having a first segment from a first set of transaction servers to a load balancer and a second segment then to a second set of transaction servers. The network path analysis, when for the second segment, comprises: selecting a receiving transaction server of the second set of transaction servers; identifying a TCP session associated with the transaction application already in progress to the receiving transaction server; initiating a TCP traceroute using ACK packets, whose signature matches the in-progress TCP session, from the receiving transaction server to the load balancer; and determining, in reverse, a network path of layer-3 segments and associated network metrics between the receiving transaction server and the load balancer. Specific layer-3 segments of the network path causing performance degradation of the transaction application are then identifiable.

20 Claims, 17 Drawing Sheets

(56) References Cited

U.S. PATENT DOCUMENTS

2003/0195861 A1* 10/2003 McClure .............. H04L 63/1433
2014/0201126 A1    7/2014 Zadeh .................... G06N 7/005
                                                              706/52
2017/0126531 A1*  5/2017 Nataraj ................ H04L 43/062

* cited by examiner

US 10,904,096 B2

DEEP NETWORK PATH ANALYSIS FOR IDENTIFYING NETWORK SEGMENTS AFFECTING APPLICATION PERFORMANCE

TECHNICAL FIELD

The present disclosure relates generally to computer networks, and, more particularly, to deep network path analysis for identifying network segments affecting application performance.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

In one particular example, it can be difficult to determine the reason for an application to be experiencing an issue. For instance, determining whether it is the application that is causing the issue as opposed to the network through which the application is communicating is only the first step to troubleshooting problems. Even after establishing the network as a contributor to the problems, customers want to determine the specific network segments that are contributing to the application's performance issues. Currently, the tools available in the market involve a lot of manual stitching together of data between the application and the network, thus leading to inaccuracies and increases in the mean-time to determine the root cause of the issue.

BRIEF DESCRIPTION OF THE DRAWINGS

The embodiments herein may be better understood by referring to the following description in conjunction with the accompanying drawings in which like reference numerals indicate identically or functionally similar elements, of which.

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
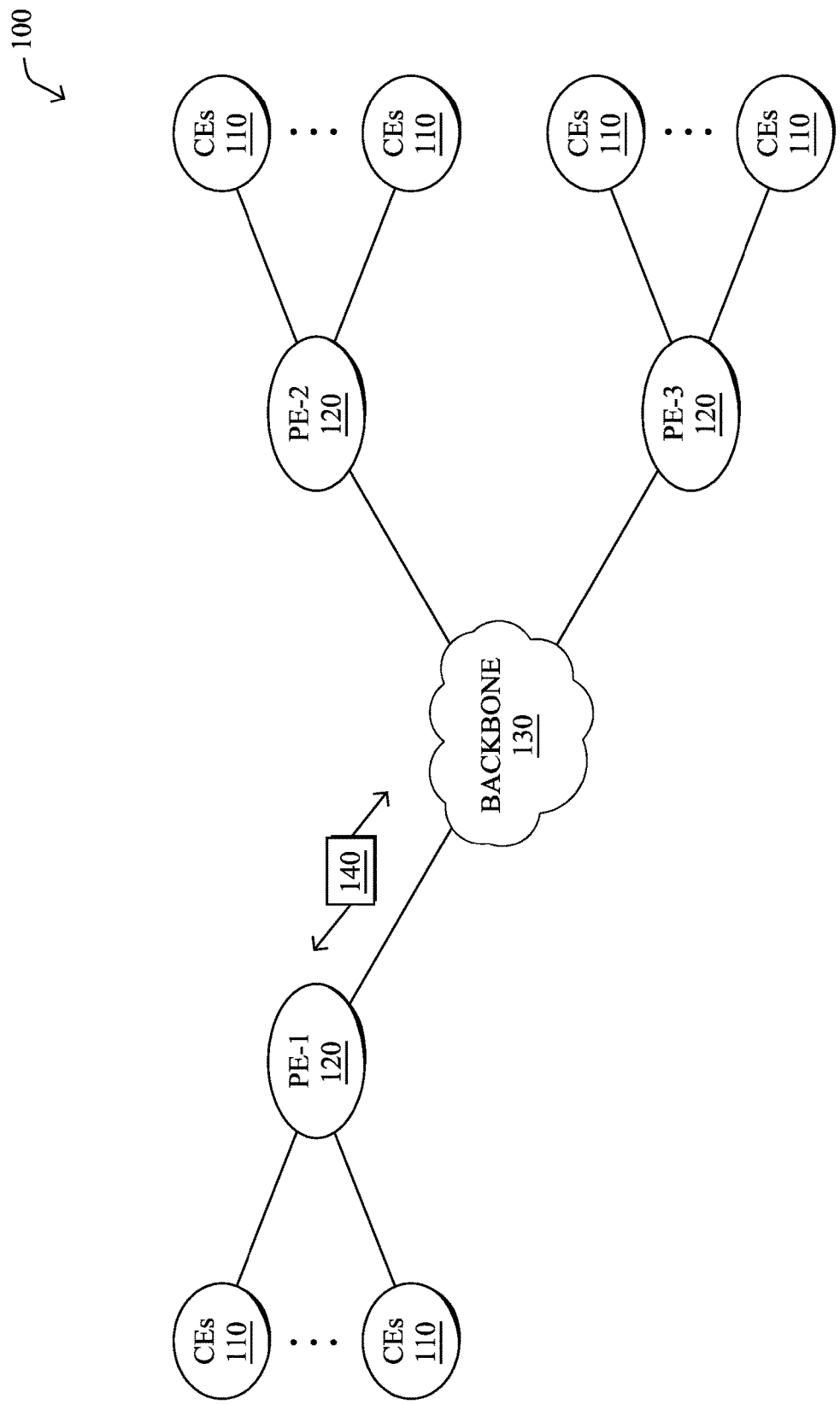
FIGS. 1A-1B illustrate an example computer network.

According to one or more embodiments of the disclosure, a network analysis process determines a trigger to initiate network path analysis for a transaction application operating over a logical transaction path having a first segment from a first set of transaction servers to a load balancer and a second segment from the load balancer to a second set of transaction servers. In response to the trigger, the network path analysis is initiated, where, in one embodiment, the network path analysis is for the second segment of the logical transaction path. Accordingly, a receiving transaction server of the second set of transaction servers is selected, and a transmission control protocol (TCP) session associated with the transaction application already in progress to the receiving transaction server is identified. A TCP traceroute using acknowledgment (ACK) packets, whose signature matches the TCP session already in progress, may then be initiated from the receiving transaction server to the load balancer in order to determine, in reverse, a network path of layer-3 segments between the receiving transaction server and the load balancer and one or more network metrics associated with each layer-3 segment of the network path based on the TCP traceroute. As such, the network analysis process may identify one or more specific layer-3 segments of the network path causing performance degradation of the transaction application based on the network path analysis.

According to one or more embodiments of the disclosure, the network path analysis is for the first segment of the logical transaction path. As such, the network path analysis selects an originating transaction server of the first set of transaction servers, and initiates a TCP traceroute using synchronize (SYN) packets associated with the transaction application from the originating transaction server to the load balancer. The network path analysis may then determine a network path of layer-3 segments between the originating transaction server and the load balancer and one or more network metrics associated with each layer-3 segment of the network path of layer-3 segments between the originating transaction server and the load balancer based on the TCP traceroute. From this, the network analysis process may then identify one or more specific layer-3 segments of the network path of layer-3 segments between the originating transaction server and the load balancer causing performance degradation of the transaction application based on the network path analysis.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication networks. That is, in addition to one or more sensors, each sensor device (node) in a sensor network may generally be equipped with a radio transceiver or other communication port, a microcontroller, and an energy source, such as a battery. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics.

Figure 1B:
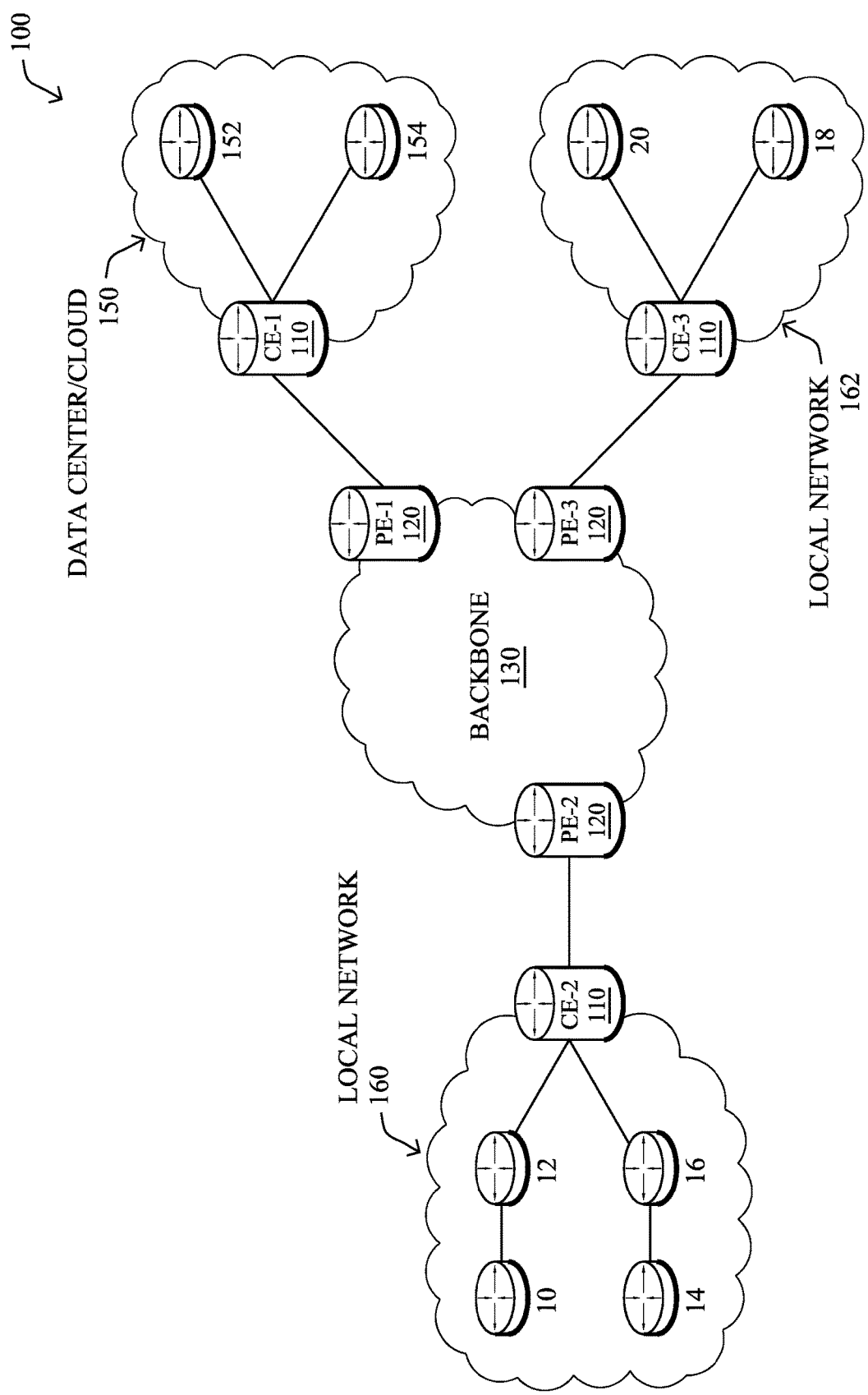

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations. Servers 152-154 may include, in various embodiments, any number of suitable servers or other cloud-based resources. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc. Furthermore, in various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
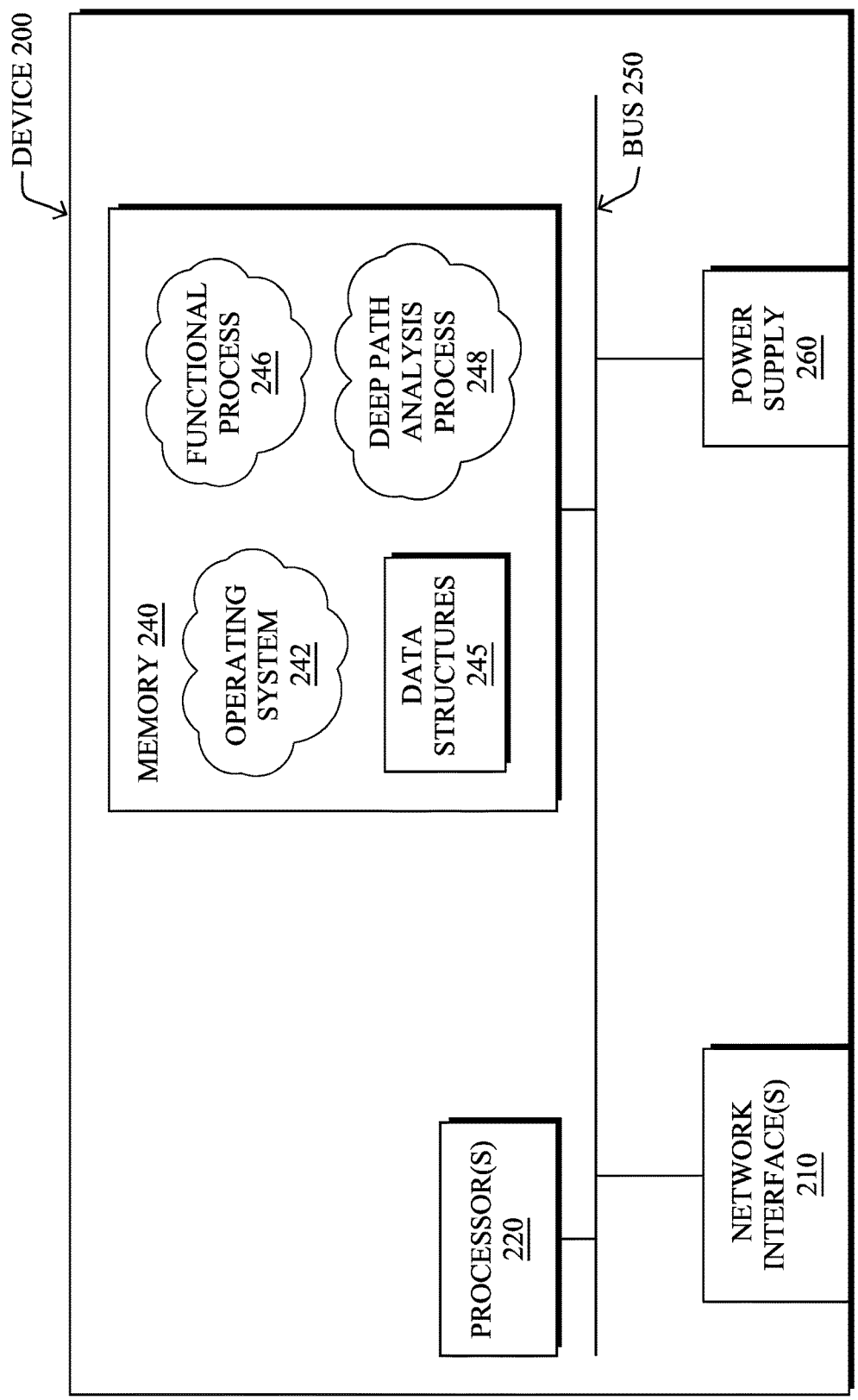
FIG. 2 illustrates an example computing device/node.

FIG. 2 is a schematic block diagram of an example computing device (e.g., apparatus) 200 that may be used with one or more embodiments described herein, e.g., as any of the devices shown in FIGS. 1A-1B above, and particularly as specific devices as described further below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, wireless transceivers, cellular transceivers, or the like, each to allow device 200 to communicate information to and from a remote computing device or server over an appropriate network. The same network interfaces 210 also allow communities of multiple devices 200 to interconnect among themselves, either peer-to-peer, or up and down a hierarchy. Note, further, that the nodes may have two different types of network connections 210, e.g., wireless and wired/physical connections, and that the view herein is merely for illustration. Also, while the network interface 210 is shown separately from power supply 260, for devices using powerline communication (PLC) or Power over Ethernet (PoE), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "deep path analysis" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

——Application Intelligence Platform——

The embodiments herein relate to an application intelligence platform for application performance management. In one aspect, as discussed with respect to FIGS. 3-5 below, performance within a networking environment may be monitored, specifically by monitoring applications and entities (e.g., transactions, tiers, nodes, and machines) in the networking environment using agents installed at individual machines at the entities. For example, each node can include one or more machines that perform part of the applications. The agents collect data associated with the applications of interest and associated nodes and machines where the applications are being operated. Examples of the collected data may include performance data (e.g., metrics, metadata, etc.) and topology data (e.g., indicating relationship information). The agent-collected data may then be provided to one or more servers or controllers to analyze the data.

Figure 3:
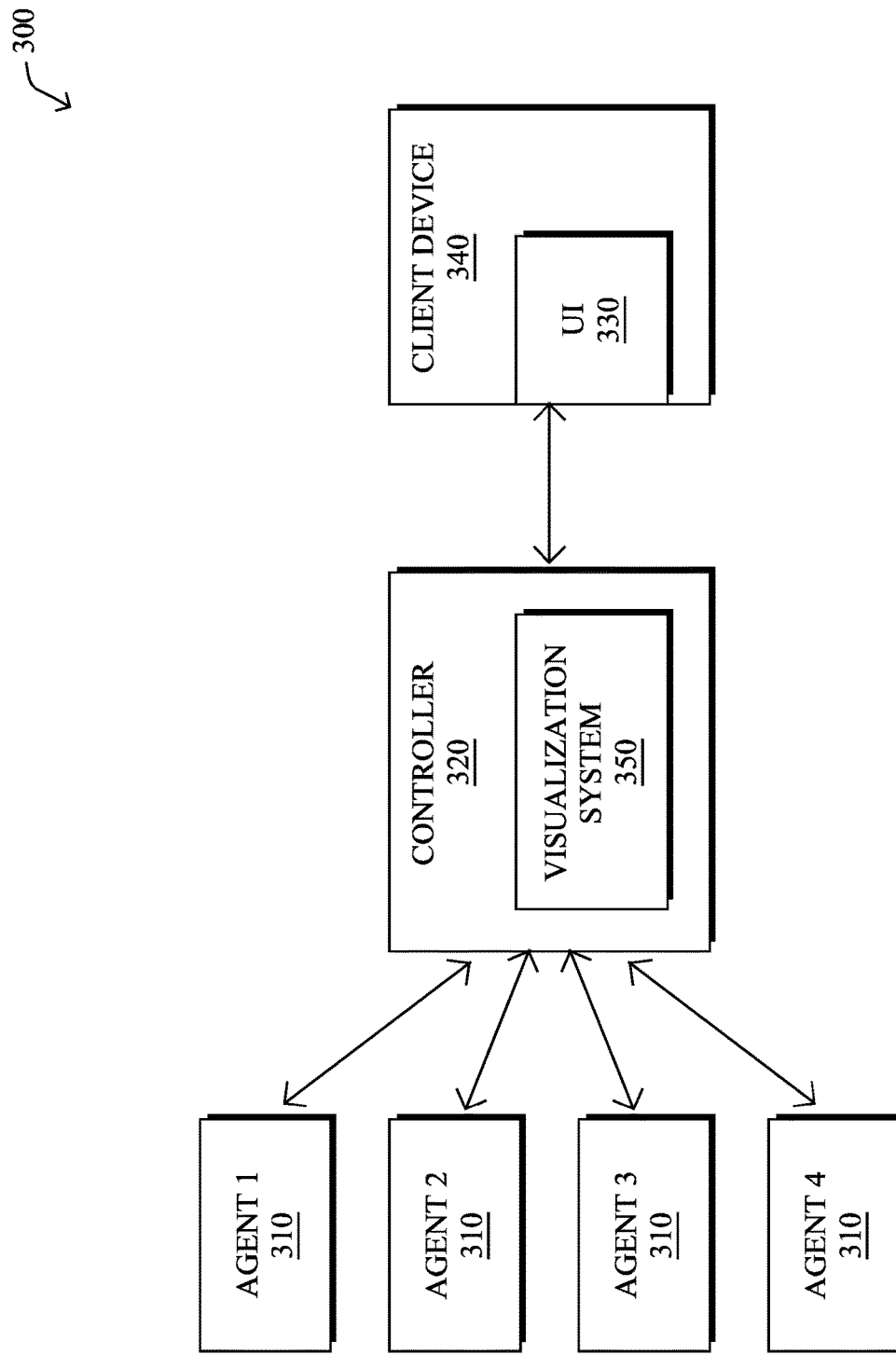
FIG. 3 illustrates an example application intelligence platform.

FIG. 3 is a block diagram of an example application intelligence platform 300 that can implement one or more aspects of the techniques herein. The application intelligence platform is a system that monitors and collects metrics of performance data for an application environment being monitored. At the simplest structure, the application intelligence platform includes one or more agents 310 and one or more servers/controllers 320. Note that while FIG. 3 shows four agents (e.g., Agent 1 through Agent 4) communicatively linked to a single controller, the total number of agents and controllers can vary based on a number of factors including the number of applications monitored, how distributed the application environment is, the level of monitoring desired, the level of user experience desired, and so on.

The controller 320 is the central processing and administration server for the application intelligence platform. The controller 320 serves a browser-based user interface (UI) 330 that is the primary interface for monitoring, analyzing, and troubleshooting the monitored environment. The controller 320 can control and manage monitoring of business transactions (described below) distributed over application servers. Specifically, the controller 320 can receive runtime data from agents 310 (and/or other coordinator devices), associate portions of business transaction data, communicate with agents to configure collection of runtime data, and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the application intelligence platform 300. In an illustrative on-premise (On-Prem) implementation, a controller instance 320 may be installed locally and self-administered.

The controllers 320 receive data from different agents 310 (e.g., Agents 1-4) deployed to monitor applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Database agents query the monitored databases in order to collect metrics and pass those metrics along for display in a metric browser (e.g., for database monitoring and analysis within databases pages of the controller's UI 330). Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. A standalone machine agent has an extensible architecture (e.g., designed to accommodate changes).

End user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs. Notably, browser agents (e.g., agents 310) can include Reporters that report monitored data to the controller.

Browser agents and mobile agents are generally unlike other monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Application Intelligence Monitoring: The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling: Entities in the application environment (such as the JBoss service, MQSeries modules, and databases) and the services provided by the entities (such as a login transaction, service or product search, or purchase transaction) may be mapped to an application intelligence model. In the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions: A business transaction representation of the particular service provided by the monitored environment provides a view on performance data in the context of the various tiers that participate in processing a particular request. A business transaction, which may each be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to an HTTP payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)).

Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

A node in the application intelligence model corresponds to a monitored server or JVM in the application environment. A node is the smallest unit of the modeled environment. In general, a node corresponds to an individual application server, JVM, or Common Language Runtime (CLR) on which a monitoring Agent is installed. Each node identifies itself in the application intelligence model. The Agent installed at the node is configured to specify the name of the node, tier, and business application under which the Agent reports data to the Controller.

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for system by detecting slow, very slow, and stalled transactions. Configurable thresholds provide a flexible way to associate the right business context with a slow request to isolate the root cause.

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. In some implementations, this health rule can define a warning condition as the combination of an average response time greater than the default baseline by 2 standard deviations and a load greater than 100 calls per minute. In some implementations, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some implementations, this health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts.

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots provide a detailed picture of a given application at a certain point in time. Snapshots usually include call graphs that allow that enables drilling down to the line of code that may be causing performance problems. The most common snapshots are transaction snapshots.

Figure 4:
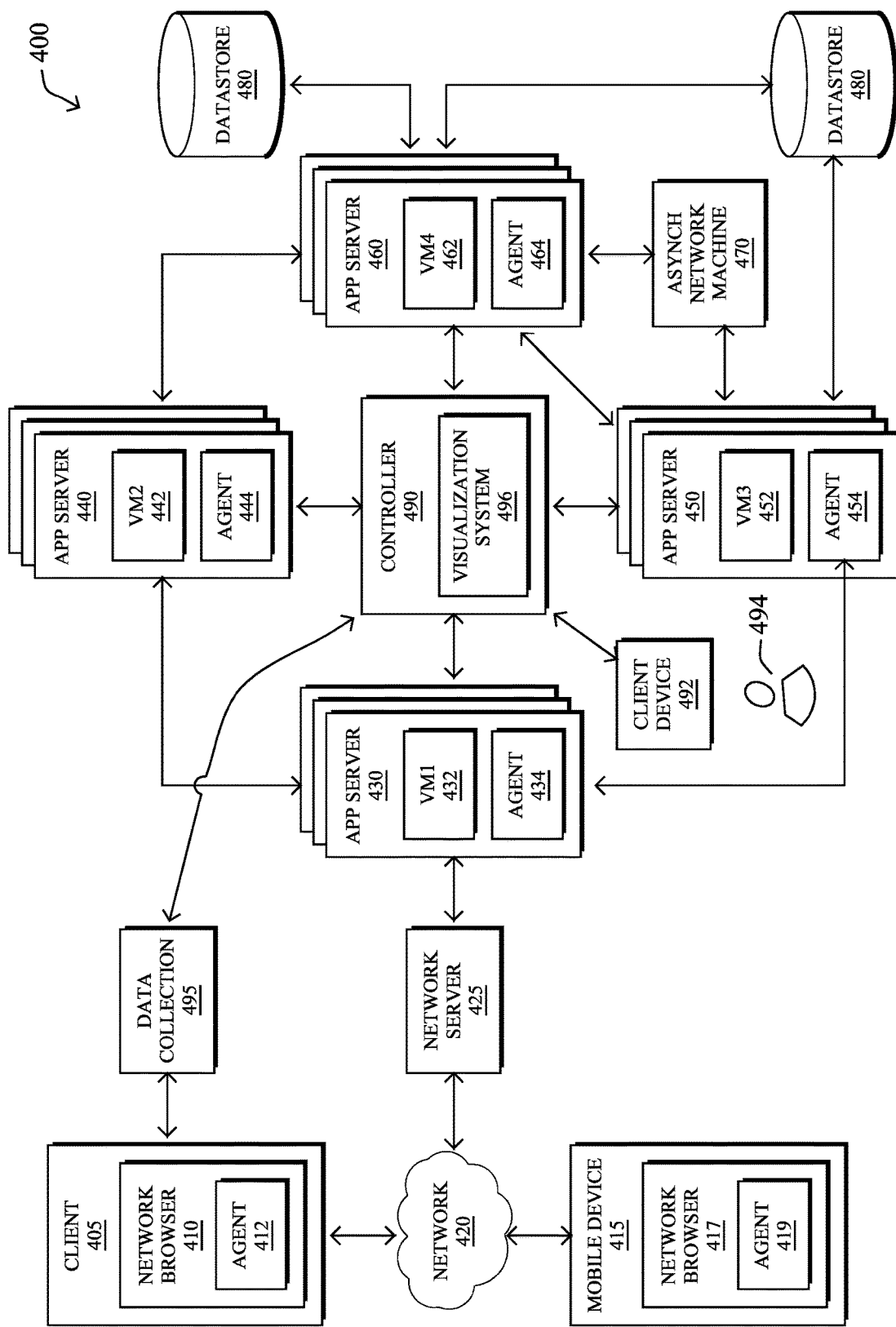
FIG. 4 illustrates an example system for an application-aware intrusion detection system.

FIG. 4 illustrates an example application intelligence platform (system) 400 for performing one or more aspects of the techniques herein. The system 400 in FIG. 4 includes client device 405 and 492, mobile device 415, network 420, network server 425, application servers 430, 440, 450, and 460, asynchronous network machine 470, data stores 480 and 485, controller 490, and data collection server 495. The controller 490 can include visualization system 496 for providing displaying of the report generated for performing the field name recommendations for field extraction as disclosed in the present disclosure. In some implementations, the visualization system 496 can be implemented in a separate machine (e.g., a server) different from the one hosting the controller 490.

Client device 405 may include network browser 410 and be implemented as a computing device, such as for example a laptop, desktop, workstation, or some other computing device. Network browser 410 may be a client application for viewing content provided by an application server, such as application server 430 via network server 425 over network 420.

Network browser 410 may include agent 412. Agent 412 may be installed on network browser 410 and/or client 405 as a network browser add-on, downloading the application to the server, or in some other manner. Agent 412 may be executed to monitor network browser 410, the operating system of client 405, and any other application, API, or another component of client 405. Agent 412 may determine network browser navigation timing metrics, access browser cookies, monitor code, and transmit data to data collection 460, controller 490, or another device. Agent 412 may perform other operations related to monitoring a request or a network at client 405 as discussed herein including report generating.

Mobile device 415 is connected to network 420 and may be implemented as a portable device suitable for sending and receiving content over a network, such as for example a mobile phone, smart phone, tablet computer, or other portable device. Both client device 405 and mobile device 415 may include hardware and/or software configured to access a web service provided by network server 425.

Mobile device 415 may include network browser 417 and an agent 419. Mobile device may also include client applications and other code that may be monitored by agent 419. Agent 419 may reside in and/or communicate with network browser 417, as well as communicate with other applications, an operating system, APIs and other hardware and software on mobile device 415. Agent 419 may have similar functionality as that described herein for agent 412 on client 405, and may repot data to data collection server 460 and/or controller 490.

Network 420 may facilitate communication of data among different servers, devices and machines of system 400 (some connections shown with lines to network 420, some not shown). The network may be implemented as a private network, public network, intranet, the Internet, a cellular network, Wi-Fi network, VoIP network, or a combination of one or more of these networks. The network 420 may include one or more machines such as load balance machines and other machines.

Network server 425 is connected to network 420 and may receive and process requests received over network 420. Network server 425 may be implemented as one or more servers implementing a network service, and may be implemented on the same machine as application server 430 or one or more separate machines. When network 420 is the Internet, network server 425 may be implemented as a web server.

Application server 430 communicates with network server 425, application servers 440 and 450, and controller 490. Application server 450 may also communicate with other machines and devices (not illustrated in FIG. 3). Application server 430 may host an application or portions of a distributed application. The host application 432 may be in one of many platforms, such as including a Java, PHP, .Net, and Node.JS, be implemented as a Java virtual machine, or include some other host type. Application server 430 may also include one or more agents 434 (i.e., "modules"), including a language agent, machine agent, and network agent, and other software modules. Application server 430 may be implemented as one server or multiple servers as illustrated in FIG. 4.

Application 432 and other software on application server 430 may be instrumented using byte code insertion, or byte code instrumentation (BCI), to modify the object code of the application or other software. The instrumented object code may include code used to detect calls received by application 432, calls sent by application 432, and communicate with agent 434 during execution of the application. BCI may also be used to monitor one or more sockets of the application and/or application server in order to monitor the socket and capture packets coming over the socket.

In some embodiments, server 430 may include applications and/or code other than a virtual machine. For example, servers 430, 440, 450, and 460 may each include Java code, .Net code, PHP code, Ruby code, C code, C++ or other binary code to implement applications and process requests received from a remote source. References to a virtual machine with respect to an application server are intended to be for exemplary purposes only.

Agents 434 on application server 430 may be installed, downloaded, embedded, or otherwise provided on application server 430. For example, agents 434 may be provided in server 430 by instrumentation of object code, downloading the agents to the server, or in some other manner. Agent 434 may be executed to monitor application server 430, monitor code running in a virtual machine 432 (or other program language, such as a PHP, .Net, or C program), machine resources, network layer data, and communicate with byte instrumented code on application server 430 and one or more applications on application server 430.

Each of agents 434, 444, 454, and 464 may include one or more agents, such as language agents, machine agents, and network agents. A language agent may be a type of agent that is suitable to run on a particular host. Examples of language agents include a Java agent, .Net agent, PHP agent, and other agents. The machine agent may collect data from a particular machine on which it is installed. A network agent may capture network information, such as data collected from a socket.

Agent 434 may detect operations such as receiving calls and sending requests by application server 430, resource usage, and incoming packets. Agent 434 may receive data, process the data, for example by aggregating data into metrics, and transmit the data and/or metrics to controller 490. Agent 434 may perform other operations related to monitoring applications and application server 430 as discussed herein. For example, agent 434 may identify other applications, share business transaction data, aggregate detected runtime data, and other operations.

An agent may operate to monitor a node, tier or nodes or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agent may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from one or more network interfaces (e.g., so that data generated/received by all the applications using sockets can be intercepted). The network agent may receive flow data from a language agent that is associated with applications to be monitored. For flows in the flow group data that match flow data provided by the language agent, the network agent rolls up the flow data to determine metrics such as TCP throughput, TCP loss, latency, and bandwidth. The network agent may then report the metrics, flow group data, and call chain data to a controller. The network agent may also make system calls at an application server to determine system information, such as for example a host status check, a network status check, socket status, and other information.

A machine agent may reside on the host and collect information regarding the machine which implements the host. A machine agent may collect and generate metrics from information such as processor usage, memory usage, and other hardware information.

Each of the language agent, network agent, and machine agent may report data to the controller. Controller 490 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 434 may create a request identifier for a request received by server 430 (for example, a request received by a client 405 or 415 associated with a user or another source). The request identifier may be sent to client 405 or mobile device 415, whichever device sent the request. In embodiments, the request identifier may be created when a data is collected and analyzed for a particular business transaction.

Each of application servers 440, 450, and 460 may include an application and agents. Each application may run on the corresponding application server. Each of applications 442, 452, and 462 on application servers 440-460 may operate similarly to application 432 and perform at least a portion of a distributed business transaction. Agents 444, 454, and 464 may monitor applications 442-462, collect and process data at runtime, and communicate with controller 490. The applications 432, 442, 452, and 462 may communicate with each other as part of performing a distributed transaction. Each application may call any application or method of another virtual machine.

Asynchronous network machine 470 may engage in asynchronous communications with one or more application servers, such as application server 450 and 460. For example, application server 450 may transmit several calls or messages to an asynchronous network machine. Rather than communicate back to application server 450, the asynchronous network machine may process the messages and eventually provide a response, such as a processed message, to application server 460. Because there is no return message from the asynchronous network machine to application server 450, the communications among them are asynchronous.

Data stores 480 and 485 may each be accessed by application servers such as application server 450. Data store 485 may also be accessed by application server 450. Each of data stores 480 and 485 may store data, process data, and return queries received from an application server. Each of data stores 480 and 485 may or may not include an agent.

Controller 490 may control and manage monitoring of business transactions distributed over application servers 430-460. In some embodiments, controller 490 may receive application data, including data associated with monitoring client requests at client 405 and mobile device 415, from data collection server 460. In some embodiments, controller 490 may receive application monitoring data and network data from each of agents 412, 419, 434, 444, and 454 (also referred to herein as "application monitoring agents"). Controller 490 may associate portions of business transaction data, communicate with agents to configure collection of data, and provide performance data and reporting through an interface. The interface may be viewed as a web-based interface viewable by client device 492, which may be a mobile device, client device, or any other platform for viewing an interface provided by controller 490. In some embodiments, a client device 492 may directly communicate with controller 490 to view an interface for monitoring data.

Client device 492 may include any computing device, including a mobile device or a client computer such as a desktop, work station or other computing device. Client computer 492 may communicate with controller 390 to create and view a custom interface. In some embodiments, controller 490 provides an interface for creating and viewing the custom interface as a content page, e.g., a web page, which may be provided to and rendered through a network browser application on client device 492.

Applications 432, 442, 452, and 462 may be any of several types of applications. Examples of applications that may implement applications 432-462 include a Java, PHP, .Net, Node.JS, and other applications.

Figure 5:
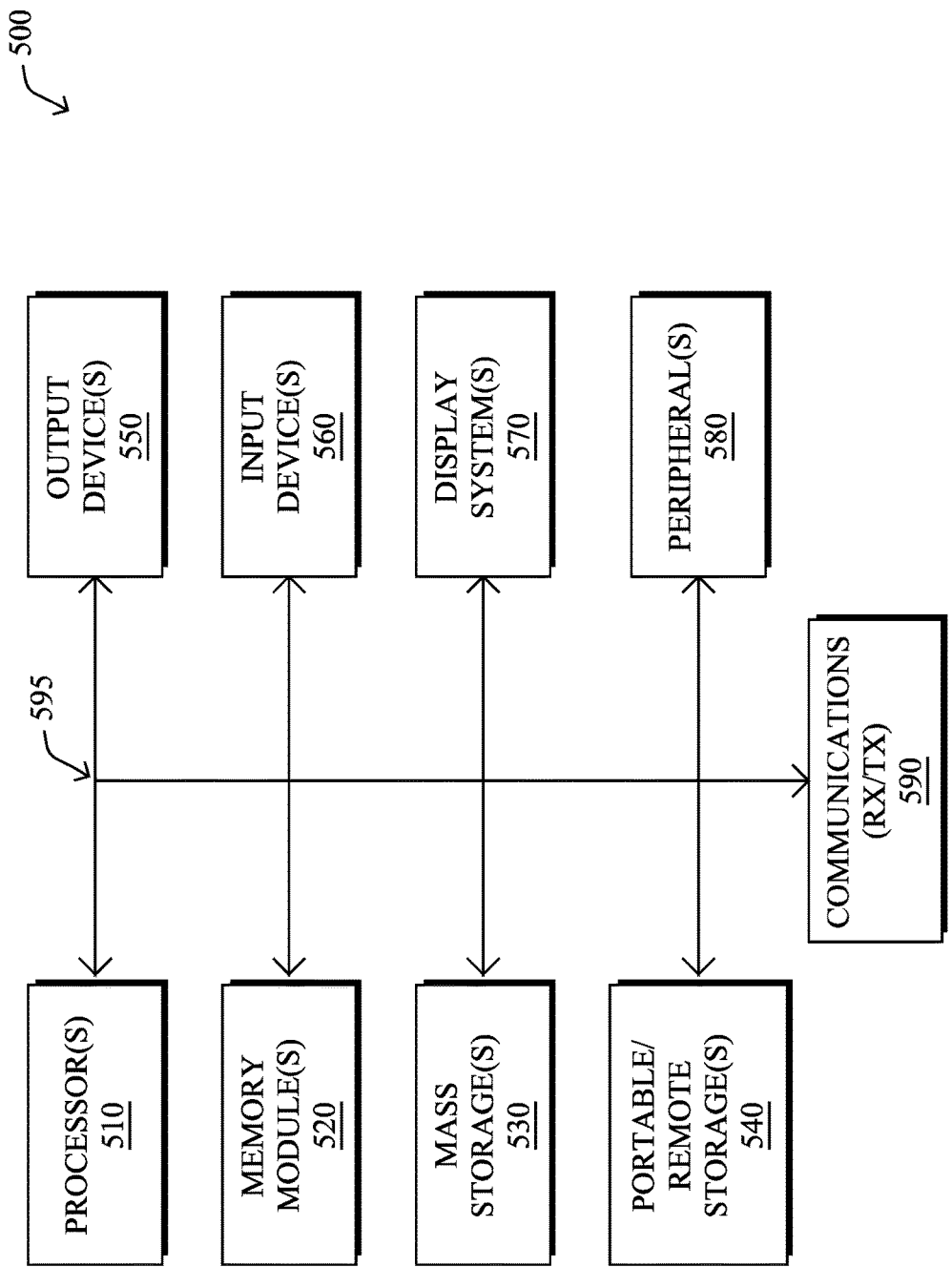
FIG. 5 illustrates an example computing system implementing the disclosed technology.

FIG. 5 is a block diagram of a computer system 500 for implementing the present technology, which is a specific implementation of device 200 of FIG. 2 above. System 500 of FIG. 5 may be implemented in the contexts of the likes of clients 405, 492, network server 425, servers 430, 440, 450, 460, a synchronous network machine 470, and controller 490 of FIG. 4. (Note that the specifically configured system 500 of FIG. 5 and the customized device 200 of FIG. 2 are not meant to be mutually exclusive, and the techniques herein may be performed by any suitably configured computing device.)

The computing system 500 of FIG. 5 includes one or more processors 510 and memory 520. Main memory 520 stores, in part, instructions and data for execution by processor 510. Main memory 510 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable or remote storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 520.

Portable storage device 540 operates in conjunction with a portable non-volatile storage medium, such as a compact disk, digital video disk, magnetic disk, flash storage, etc. to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 500 of FIG. 5 may include one or more antennas, radios, and other circuitry for communicating over wireless signals, such as for example communication using Wi-Fi, cellular, or other wireless signals.

——Identifying Network Segments Affecting Application Performance——

As noted above, it can be difficult to determine the actual reason for an application to be experiencing an issue, particularly whether it is the application or the underlying network that is causing the issue. Even where it can be established that the network is a contributor to the problems, it is still important to determine the specific network segments that are contributing to the application's performance issues. That is, the ability to identify where and which network elements (along a logical business transaction path) are causing either consistent or intermittent performance degradations (e.g., latency) is particularly useful for administrators and mitigation processes, and has yet to be adequately addressed by previous technologies.

Figure 6:
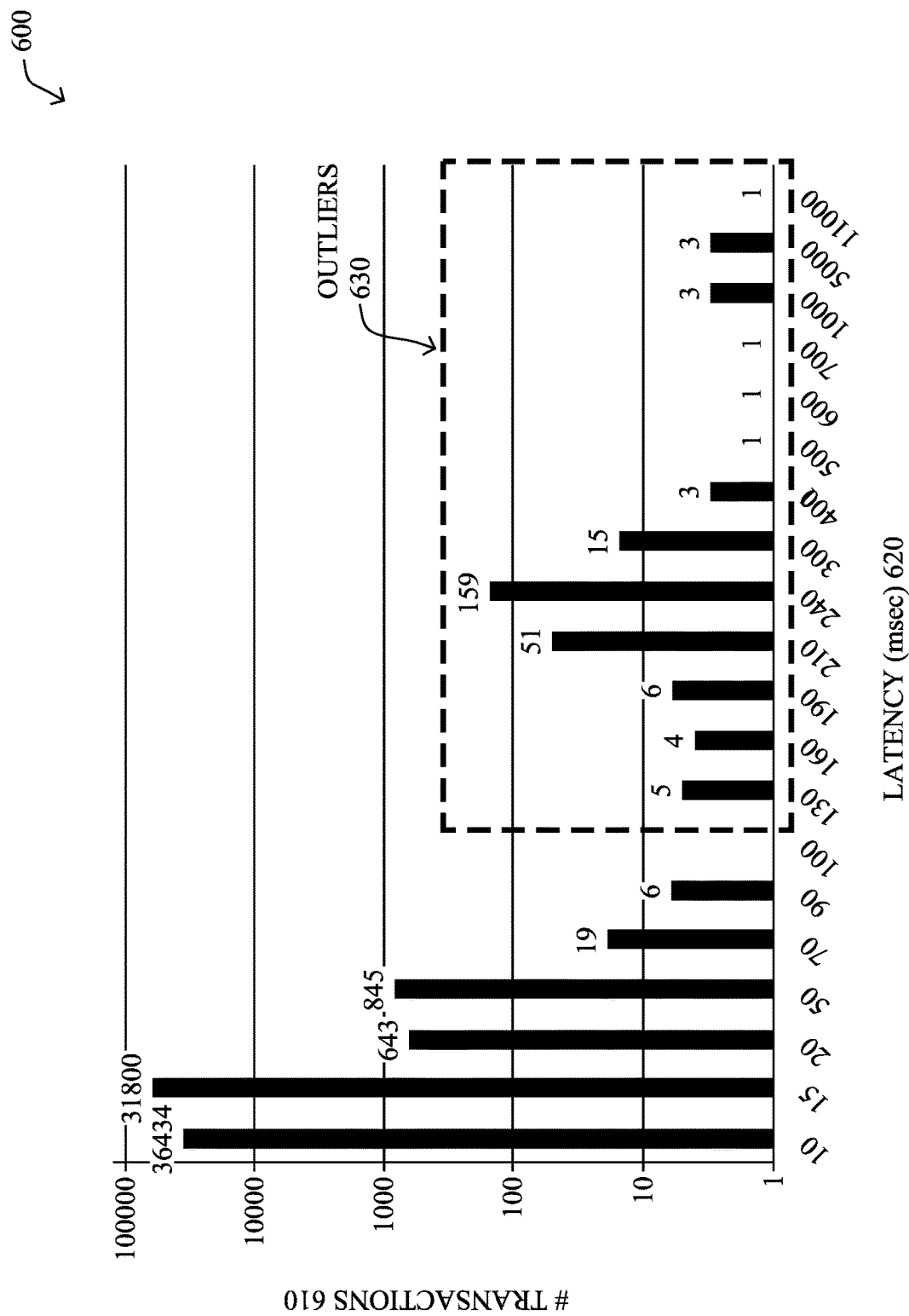
FIG. 6 illustrates an example graph of application transactions charted against application latency.

For example, one particular impact of such performance degradations is the creation of business transaction "outliers". For instance, the illustrative application intelligence platform 400 above can track individual business transactions within an application (application transactions), and the relative performance of application transactions in the aggregate, and can thus identify the "long tail" of application transaction latency, representing application transaction outliers that have significant negative impact on the end user's experience. FIG. 6 illustrates an example graph 600 of a number (#) of application transactions 610 charted against application latency 620 (e.g., in milliseconds (msec)), showing a collection of outliers 630 (e.g., that generally surpass some threshold of tolerance).

Since the network can have a significant impact on business transaction performance (e.g., the long tail of latency, e.g., outliers 630 as shown in FIG. 6 above), such as due to its latency, packet drops, delay, jitter, etc., it is important to identify where and which network element is causing such performance degradations along the business transaction's path.

The techniques herein, therefore, provide for different techniques of deep path analysis that allow identifying the specific layer-3 segments that are causing the degradation to the business transaction. In particular, if the degradation is happening on the left side of the load balancer, deep path analysis initiates a TCP traceroute using synchronize (SYN)

packets from one of the nodes of the left-side servers (e.g., an ecommerce or "ECom" Tier) to return the full path to the load balancer and to identify the specific layer-3 segments that are causing the degradation to the business transaction. Similarly, if the degradation is happening on the right side of the load balancer, deep path analysis is initiated from one of the nodes of the right-side servers (e.g., an Order Tier). Here, the business-transaction-aware deep path analysis picks a specific business transaction application port and then identifies a TCP session already in progress, initiating a TCP traceroute using acknowledgment (ACK) packets that then match the session in progress in order to return the full path reverse to the load balancer and to identify the specific layer-3 segments that are causing the degradation to the business transaction, accordingly.

Illustratively, the techniques described herein may be performed by hardware, software, and/or firmware, such as in accordance with the illustrative deep path analysis process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.).

Figure 7:
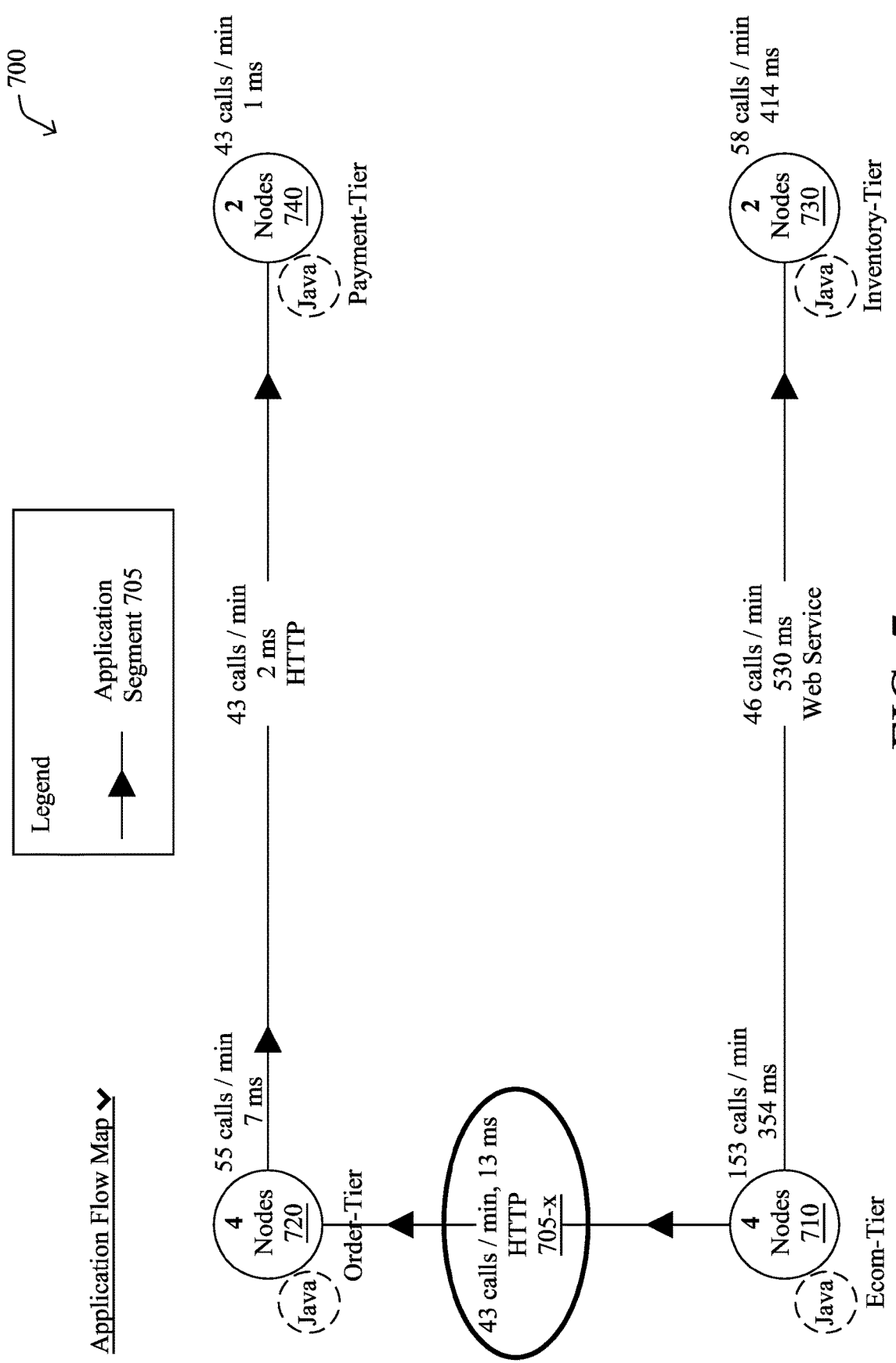
FIG. 7 illustrates an example graphical user interface (GUI) showing a logical transaction path and associated information.

Operationally, the techniques herein first identify the specific business transaction segment (application transaction segment) that is experiencing performance degradation (e.g., latency degradation, among other metrics indicative of performance degradation). As shown in FIG. 7, for example, an illustrative graphical user interface (GUI) shows a logical transaction path 700 (e.g., an application flow map) and associated information regarding an application flow. For example, one or more ecommerce (ECom) servers 710 (of an ECom tier) may participate in application transactions with one or more order servers 720 (of an Order tier) and one or more inventory servers 730 (of an Inventory tier) over application transaction "segments" 705. Also, the Order tier may further participate with one or more payment servers 740 (of a Payment tier). Various databases may also be associated with each set of servers/tiers, and the view shown herein is simplified for sake of discussion.

Information displayed on the GUI of the logical transaction path 700 may comprise various application metrics, such as number or rate of calls, average transaction latency, underlying protocol (e.g., HTTP, Web Service, etc.), number of nodes/devices at each tier (e.g., number of servers being monitored that are associated with the application flow), and so on.

Assume for the sake of discussion that the specific application transaction (business transaction) segment 705 that is experiencing performance (e.g., latency) degradation is detected as segment "705-*x*". In one embodiment, the application intelligence platform dynamically determines the performance degradation (e.g., based on policies, thresholds, baseline comparisons, etc.), while in an additional or alternative embodiment, a user identifies the specific segment that is experiencing latency degradation though manual interpretation of the information.

Figure 8:
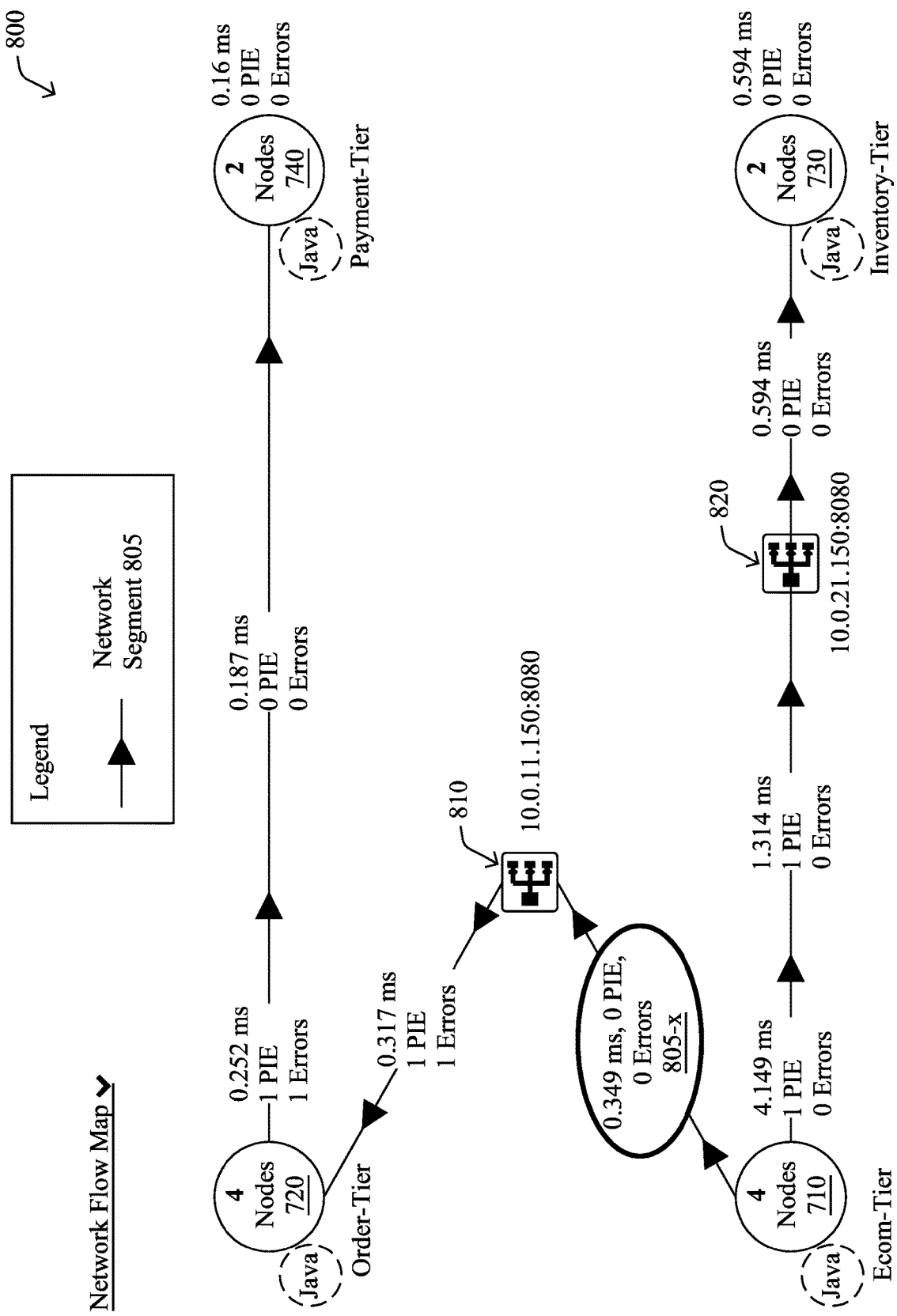
FIG. 8 illustrates an example GUI showing the logical transaction path and associated information in an example network underlay view.

FIG. 8 represents a network underlay view 800 (e.g., network flow map), which may be illustratively selected by the user within a GUI, to show the specific network segments 805. In particular, one or more load balancers, such as load balancer 810 between the ECom servers 710 and Order servers 720, as well as load balancer 820 between the ECom server 710 and Inventory servers 730, may now be shown to demonstrate the separate of network segments to either side of the load balancers. For example, in traditional "east-west" traffic (i.e., traffic between servers, as opposed to "north-south" traffic between servers and clients), multiple similarly capable servers may be located on each side of the load balancer (e.g., one-to-many, many-to-one, and many-to-many) in order to distribute traffic demands among the sets of servers. As used herein, "left-side" servers are those originating the traffic to the load balancers (and similarly, over "left-side" segments), while "right-side" servers are those receiving the traffic from the load balancers (and similarly, over "right-side" segments).

From the network underlay view 800, it can be specifically seen that first and second network segments (left-side and right-side segments) exist between the ECom servers 710 and Order servers 720, via a load balancer 810. As such, the techniques herein allow for verifying/determining whether the degradation is due to a network issue on a specific side of the load balancer 810.

If the performance degradation is happening on the left-side of the load balancer, shown as selected segment 805-*x*, or if the platform/user simply wants to determine whether the degradation is happening on that side, then deep path analysis may be initiated (e.g., dynamically or at the request of a user) from one of the nodes/servers 710 of the ECom tier. (In certain embodiments, users may also have a choice of running tests on demand, such as to monitor the general health of a network, e.g., without any issues (such as for baselining or for other efficiency configurations)).

Figure 9:
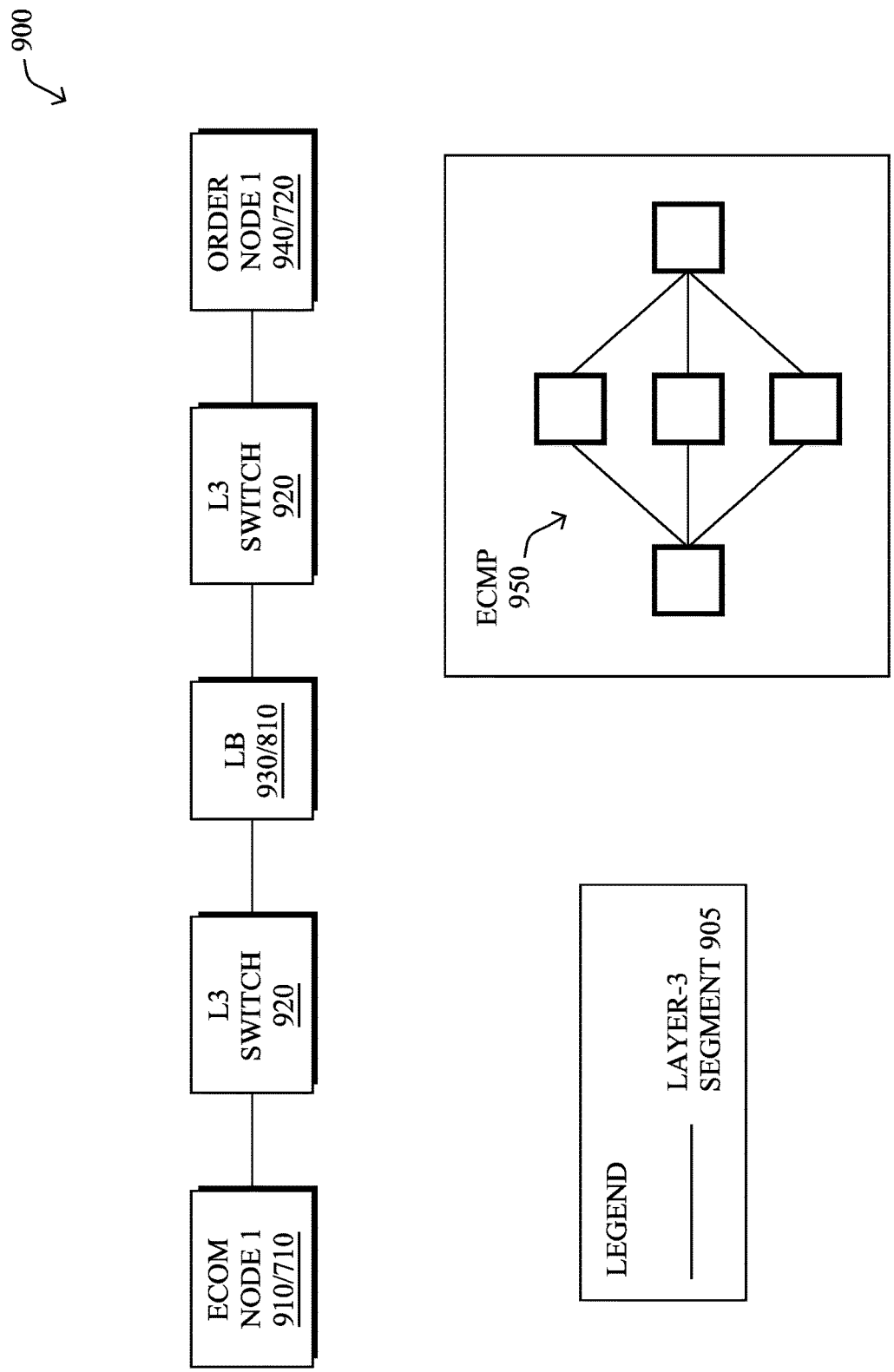
FIG. 9 illustrates an example of a network path corresponding to the logical transaction path.

Notably, the network segments 805 may be more detailed than application segments 705, but still do not fully show the complete layer-3 path between application transaction devices. For instance, as shown in FIG. 9, a layer-3 network path 900 corresponding to the logical transaction paths above (700 or 800) is shown, where layer-3 (or "L3") segments 905 are located between each layer-3 device. As shown, source end point 910 (e.g., a particular port of an ECom server "ECom Node1" 710) communicates over a communication channel made up of layer-3 segments 905, connecting one or more L3 switches 920 and a load balancer (LB) 930 (e.g., specific load balancer 810), to a destination end point 940 (e.g., Order server "Order Node1" 720). Note further that certain portions of the network 900 may comprise equal-cost multi-path (ECMP) segments, shown as a side-bar illustration 950, as will be appreciated by those skilled in the art.

Figure 10:
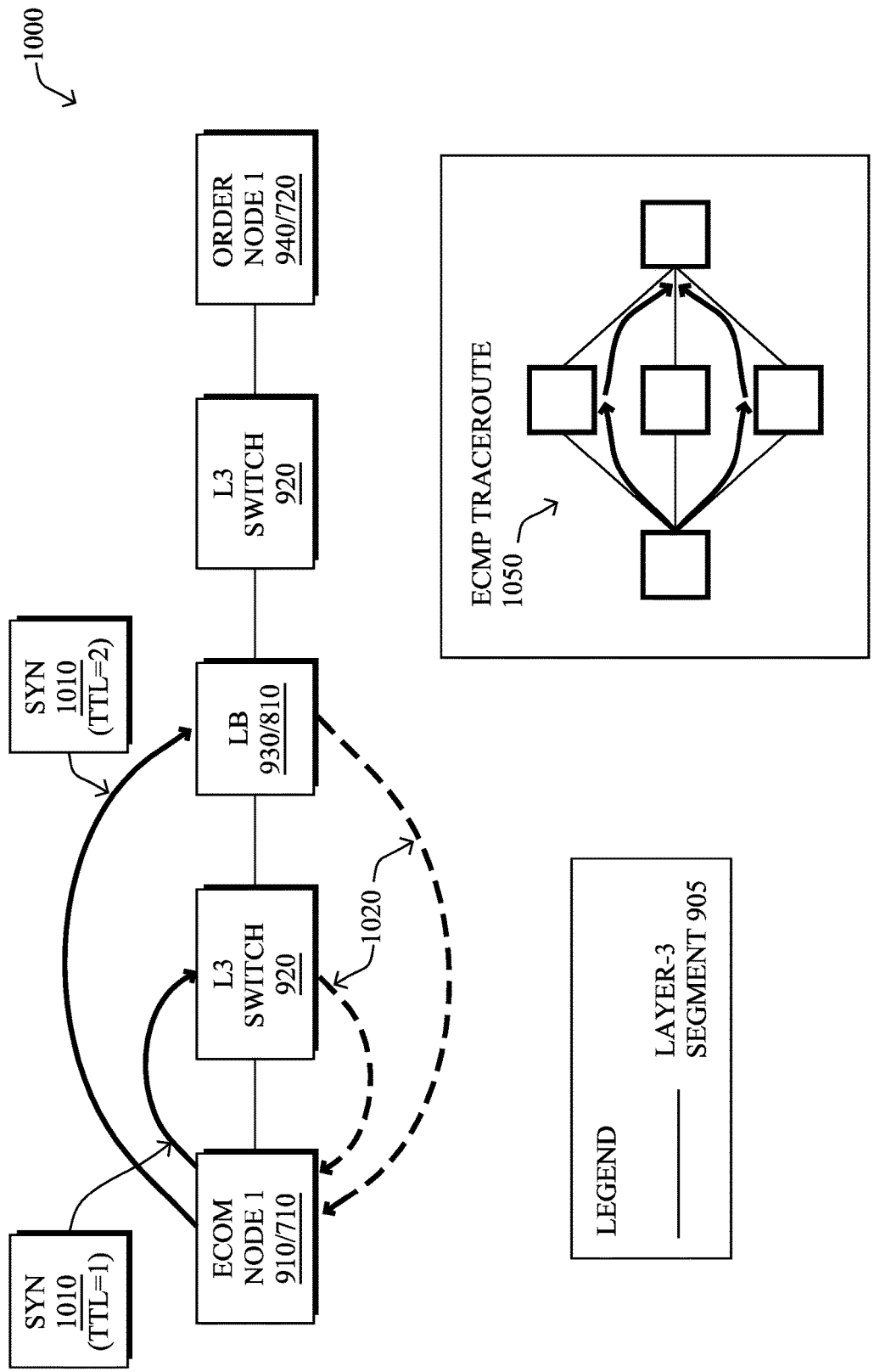
FIG. 10 illustrates an example of traceroute processing for identification of network segments.

According to the techniques herein, the initiated deep path analysis for the left-side segment (from originating servers 910/710 to load balancer 930/810) may select a specific application transaction port, and initiates a TCP traceroute from that selected port/server. For instance, as shown in FIG. 10, illustrating an example of traceroute processing 1000 for identification of network (layer-3) segments, synchronize (SYN) packets 1010 may be used to provide a detailed hop-by-hop view of the layer-3 network, as well as associated network metrics (e.g., latency, delay, packet drops, jitter, etc.).

For example, traceroute processing may generally use iterative packets (SYN packets 1010 in the current embodiment) sent between a source node (server 910) and destination node (load balancer 930) in a manner that tries to figure out all elements in between the end points along the communication channel to determine the intermediate links and nodes, and to determine associated network metrics. The iterative traceroute process, understood by those skilled in the art, increments time-to-live (TTL) values within the packets 1010, so that each intermediate node along the way will, at one point, receive an expiring TTL, and will get its chance to return a TTL=0 error (expiry error) in a return message 1020. (Note that in certain embodiments, an encapsulation field may be configured within the traceroute SYN packets 1010 to carry information such as node IDs and network metrics forward to another participating agent process.)

Regarding the captured information, each layer-3 segment 905 may be associated with some computable network metric. For instance, a TTL expiry error (e.g., a TCP/ICMP error) may return various metrics, such as latency to the expiring node, a node ID, and so on. Also, metrics such as total round-trip-time (from sending the packet 1010 to receiving an error reply 1020) may also be captured by the deep path analysis process (e.g., an agent process) on the source node, where latency to each particular hop may not be specifically shared. As an example, assume a first message has a TTL=1, and reaches the first node before being rejected (e.g., ICMP drop or ICMP reject), returning an error to the source. The information obtained from this first packet is that there is a device (intermediate node) with a given node ID on the communication channel at the first hop. We may not, however, know the latency from this message (that is, we know the latency based on timing of ICMP response and original TCP message when it was sent, thus being able to extrapolate how long it takes the TCP message to be sent and acknowledged—i.e., round-trip-time). For each subsequent hop (TTL=2, 3, etc.), therefore, the techniques herein can determine one or more network metrics (latency, round-trip time, etc.) associated with each layer-3 segment of the network path based on subtracting previous total network metrics of a previous iteration of the TCP traceroute from a current total network metric associated with a current iteration of the TCP traceroute. That is, by subtracting metrics of iteration "TTL=n" from iteration "TTL=n+1", the techniques herein can specifically determine the metrics associated with the final link in the TTL=n+1 chain.

Note that this TCP traceroute processing is also fully ECMP multipath aware (again, illustrated in side-bar 1050), where various instances of the TCP traceroute may traverse certain links at certain times, and other links at other times (e.g., based on standard ECMP techniques, such as hashing, equal distribution, etc.). For example, a number of traceroute traces may be performed, either a number of traces incrementally moving from TTL=1 to TTL=n reaching the load balancer, or else a number of TTL=1 SYN packets, a number of TTL=2 SYN packets, and so on, each attempting to achieve a different view of the ECMP multi-paths.

The deep path analysis on the left-side network segment thus returns the full layer-3 path from the originating server 710 to the load balancer 810, and identifies the specific layer-3 segments 905 and their metrics such that the cause of the application's performance degradation can be determined, accordingly.

Figure 11:
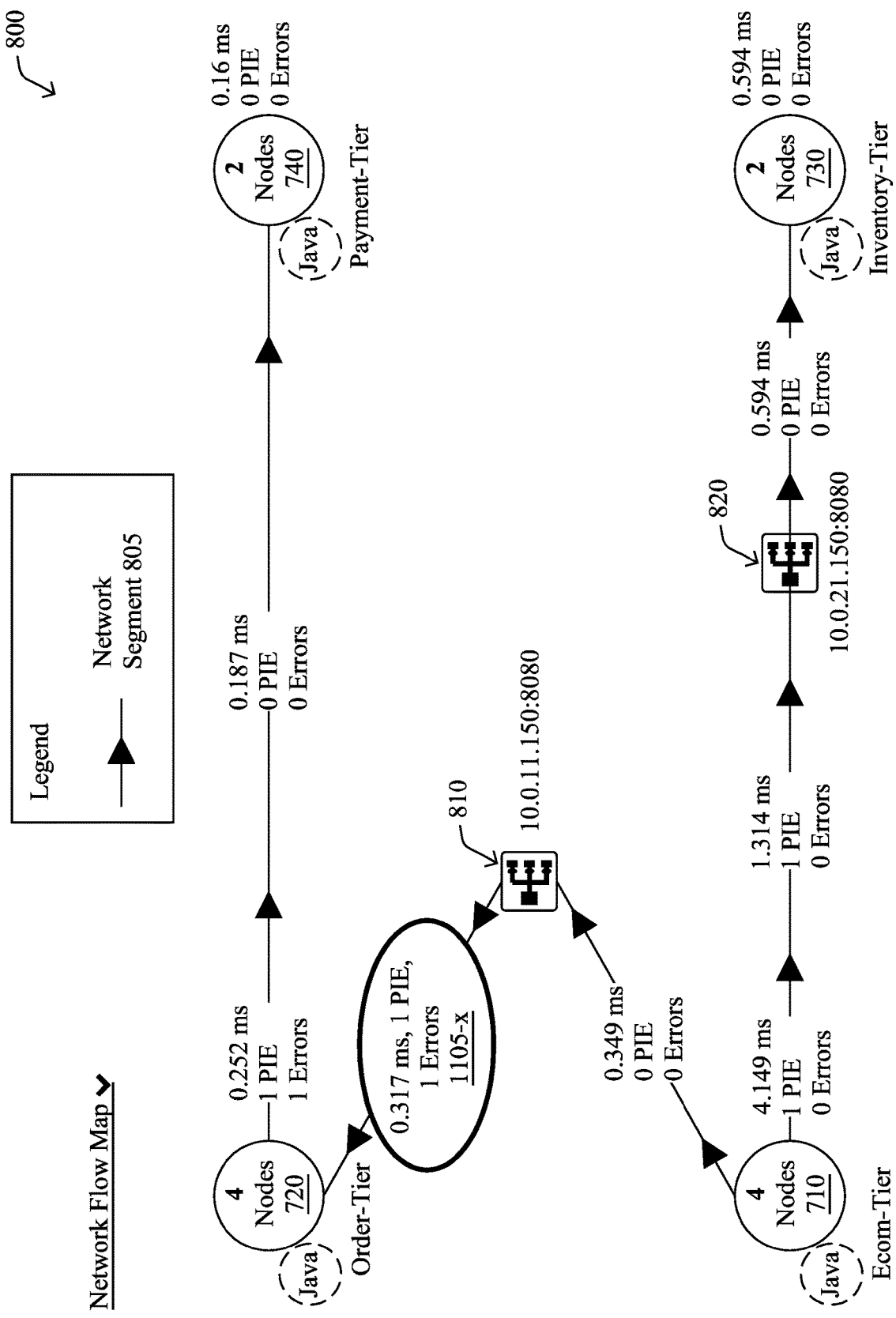
FIG. 11 illustrates another example GUI showing the logical transaction path and associated information in an example network underlay view.

Similarly, according to the techniques herein, if the performance degradation is happening (or potentially occurring) on the right-side segment (between the load balancer 810 and the receiving servers 720), such as shown in FIG. 11 (selected segment 1105-x from within view 800), the deep path analysis may be initiated from one of the receiving nodes/servers (e.g., of the Order Tier).

Figure 12:
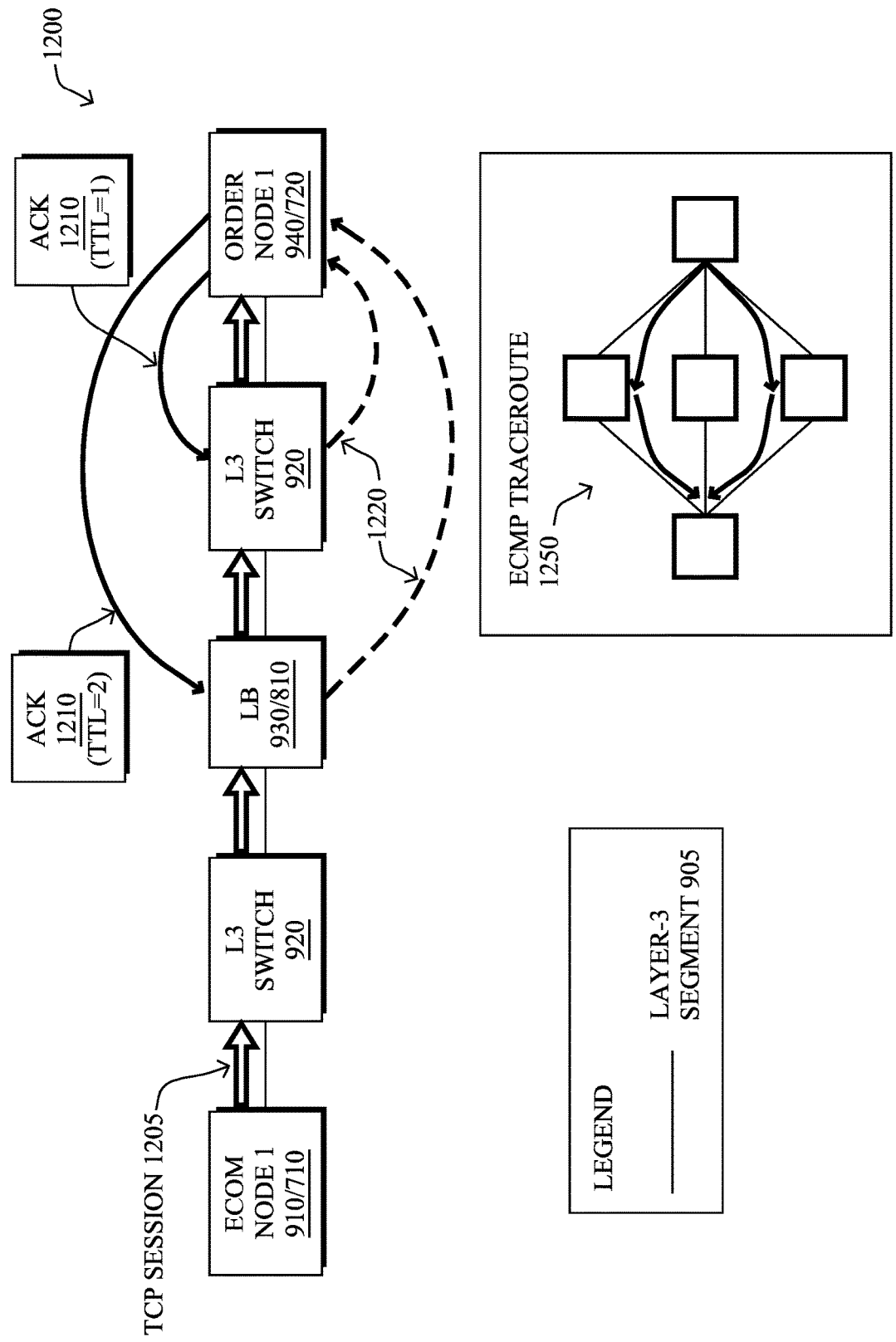
FIG. 12 illustrates another example of traceroute processing for identification of network segments, in reverse.

In particular, with reference to traceroute processing 1200 of FIG. 12, the application transaction (business transaction) aware deep path analysis may select a specific application port on a selected receiving server 720, and identifies a TCP session 1205 already in progress for the application. The techniques herein may then initiate a TCP traceroute using an acknowledgment (ACK) packet 1210 whose signature matches those of the TCP session in progress. (Again, this TCP traceroute 1200 is also fully ECMP multipath aware, as shown in side-bar 1250.) Similar to the incremental traceroute technique 1000 in FIG. 10 above, the TCP traceroute 1200 in FIG. 12 uses ACK packets 1210 to trace the layer-3 path in reverse from the receiving server 720 toward the load balancer 810, with TTL values from 1 to 'n' until reaching the load balancer (with returned TTL expiry error messages 1220). (Note again that these ACK packets may include an encapsulated field for carrying additional information.) The deep path analysis in this direction, therefore, will return the full path reverse to the load balancer and identify the specific layer-3 segments 905 and associated network metrics that could be determined to be the cause of the performance degradation of the application transactions.

Figure 13:
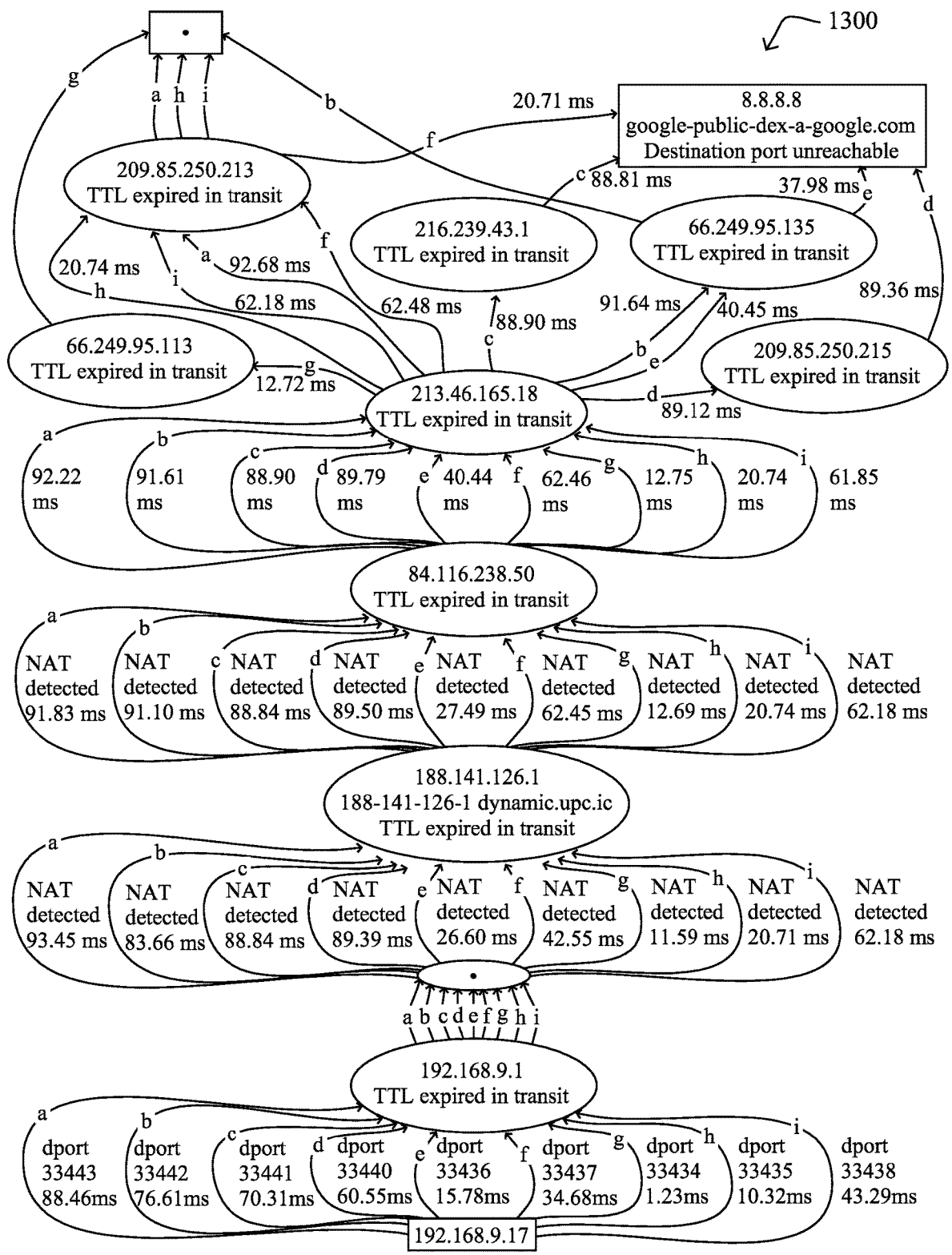
FIG. 13 illustrates an example of a GUI representing an illustrative output of deep network path analysis.

FIG. 13 illustrates an example of a GUI 1300 representing an illustrative output available from deep network path analysis.

Notably, between two application Tier nodes, there may be no way to accomplish a traditional traceroute from end-to-end. That is, load balancers work on URLs, so there is often no way to send TCP requests to certain destinations. (Unless, that is, you have an agent on the load balancer that can participate and continue the analysis process in the proper direction.) In this instance, collaboration between multiple agents may be necessary to form a complete the view of the network. Therefore, by stitching the layer-3 segments of the first/left and second/right network segments portions together (e.g., on a centralized controller), total visibility to both sides of the load balancer can be achieved herein.

Notably, the techniques herein may be specifically configured to provide analysis based on an application context. That is, in conjunction with the illustrative application intelligence platform described above, various correlations to applications (e.g., including business transactions, specifically) may be made to the network segments and associated network metrics. For example, by mimicking the application context in the transmitted packets 1010/1210, or more particularly including the context of a business transaction (e.g., a GUID within the packets), then the network metrics may be specially related to the application/transactions. This is particularly useful in cases where applications or transactions may be handled differently, such as through various proxies, firewalls, etc.

According to one or more embodiments herein, various mitigation (remediation) actions may be taken in response to isolating particular network segments affecting application performance, such as remediating against those issues (e.g., delay, packet loss, transaction misdirection, etc.) by reconfiguring the applications, the networks, or other attributes of the communication that could alleviate the issues with the application performance. Other actions, such as alarms, reports, displays (e.g., on a GUI), etc., may also be performed.

Figure 14:
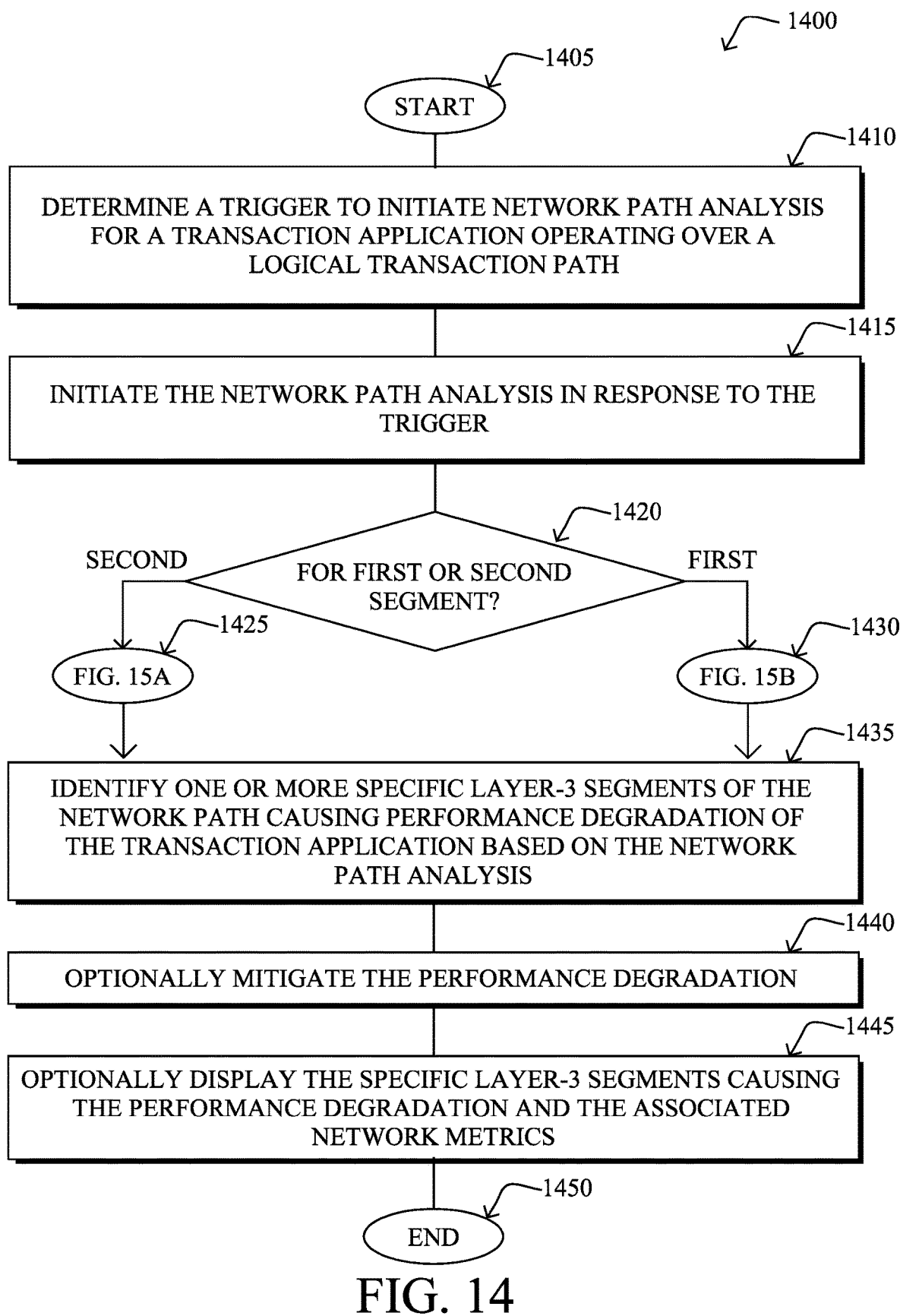
FIG. 14 illustrates an example procedure for deep network path analysis for identifying network segments affecting application performance in accordance with one or more embodiments described herein.

FIG. 14 illustrates an example procedure for deep network path analysis for identifying network segments affecting application performance in accordance with one or more embodiments described herein. For example, one or more non-generic, specifically configured devices may perform procedure 1400 by executing stored instructions (e.g., deep path analysis process 248, aka a "network analysis process"). The procedure may start at step 1405, and continues to step 1410, where, as described in greater detail above, a trigger is determined to initiate network path analysis for a transaction application operating over a logical transaction path 600 having a first segment 805 (805-x) from a first/originating set of transaction servers 710 (e.g., left-side servers, such as ECom Tier servers) to a load balancer 810 and a second segment 805 (1105-*x*) from the load balancer to a second/receiving set of transaction servers 720 (e.g., right-side servers, such as Order Tier servers). For example, as noted above, the trigger may be a detection of performance degradation of the transaction application (e.g., surpassing a threshold tolerance of application-based latency or other parameters), or else may specifically be a user request (e.g., through a GUI or otherwise).

In step 1415, in response to the trigger, the network path analysis may be initiated. In step 1420, in particular, the process determines whether the performance degradation is based on either the first network segment or the second network segment (e.g., dynamically or else by receiving an indication within the user request). If the performance degradation is based on the second network segment (e.g., between the load balancer and the second (right-side) set of servers), then the procedure continues in step 1425 to sub-procedure 1500A of FIG. 15A below to perform network path analysis to determine corresponding layer-3 segments and associated network metrics (e.g., latency, packet drops, delay, jitter, etc.) on the second network segment. Otherwise, if the performance degradation is based on the first network segment (e.g., between the first (left-side) set of servers and the load balancer), then the procedure continues in step 1430 to sub-procedure 1500B of FIG. 15B below to perform network path analysis to also determine corresponding layer-3 segments and associated network metrics on the first network segment.

Procedure 1400 then continues to step 1435, upon completion of the appropriate sub-procedure above, to identify one or more specific layer-3 segments of the analyzed network path that are causing performance degradation of the transaction application based on the network path analysis (e.g., segments and their network metrics), accordingly.

Optionally, in step 1440, the performance degradation of the transaction application may be mitigated based on the one or more specific layer-3 segments causing the performance degradation, as described above. Also, in optional step 1445, the one or more specific layer-3 segments causing the performance degradation and the one or more network metrics associated with the one or more specific layer-3 segments causing the performance degradation may be displayed on a GUI.

The illustrative procedure 1400 may then end in step 1450.

Figure 15A:
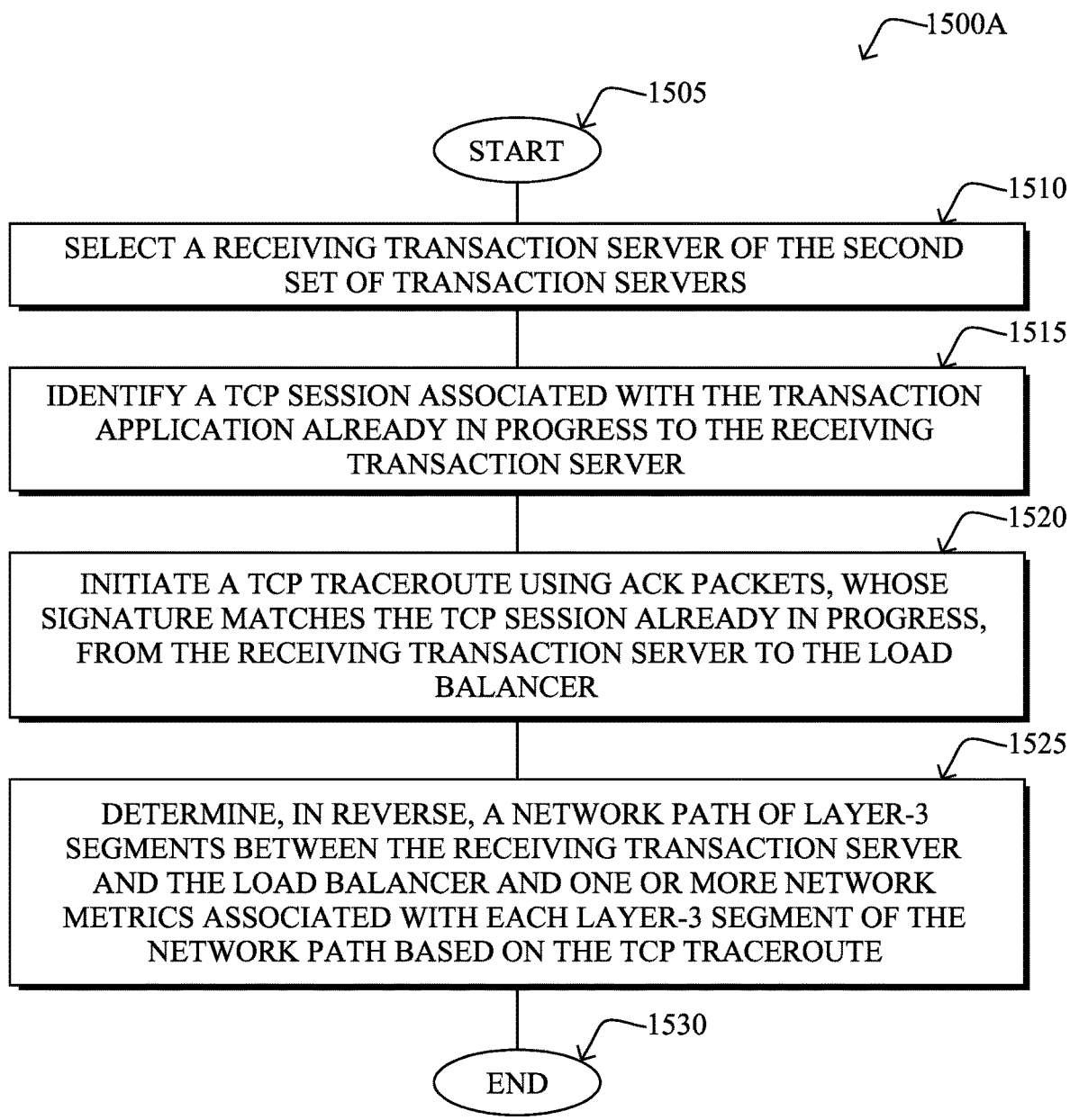
FIG. 15A illustrates an example sub-procedure for deep network path analysis in accordance with one or more embodiments described herein, particularly where the network path analysis is for a segment of the logical transaction path from a load balancer to second (right-side) set of servers.

FIG. 15A, as noted, illustrates an example sub-procedure for deep network path analysis in accordance with one or more embodiments described herein, particularly where the network path analysis is for the second segment of the logical transaction path (e.g., from the load balancer to the second (right-side) set of servers). The sub-procedure 1500A may start at step 1505 (e.g., from step 1420 of FIG. 14 above), and continues to step 1510, where, as described in greater detail above, a receiving transaction server 720 of the second set of transaction servers is selected (e.g., selecting a particular port of the receiving transaction server). In step 1515, a TCP session associated with the transaction application already in progress to the receiving transaction server is identified, such that in step 1520, a TCP traceroute may be initiated using ACK packets 1210, whose signature matches the TCP session already in progress, from the receiving transaction server to the load balancer. (Notably, as mentioned above, the TCP traceroute is ECMP aware.) Accordingly, in step 1525, the sub-procedure 1500A can determine, in reverse, a network path of layer-3 segments between the receiving transaction server and the load balancer and one or more network metrics associated with each layer-3 segment of the network path based on the TCP traceroute, ending the sub-procedure 1500A in step 1530 (and returning to step 1435 in FIG. 14, above).

Figure 15B:
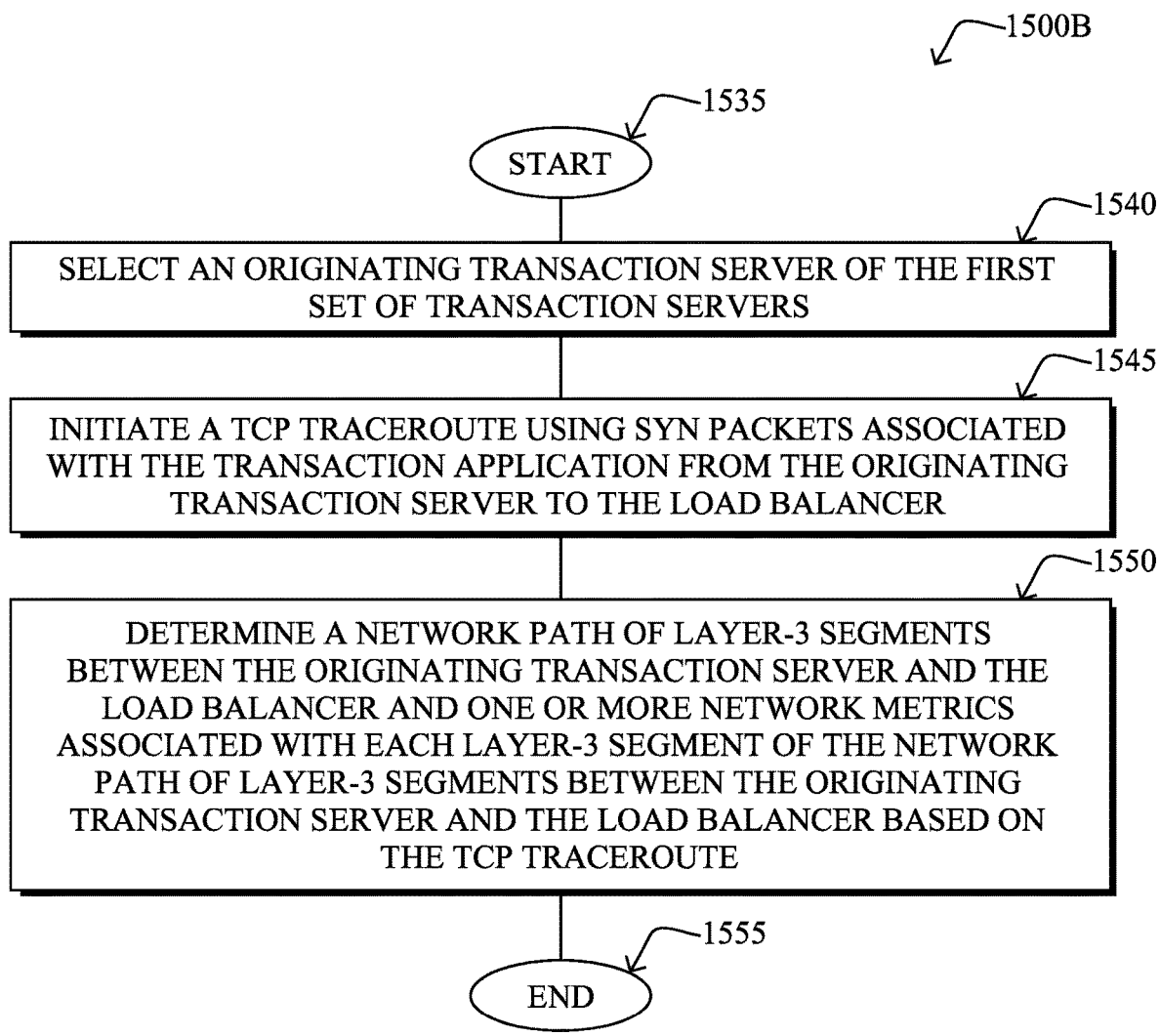
FIG. 15B illustrates another example sub-procedure for deep network path analysis in accordance with one or more embodiments described herein, particularly where the network path analysis is for a segment of the logical transaction path from a first (left-side) set of servers to the load balancer.

Alternatively, FIG. 15B illustrates another example sub-procedure for deep network path analysis in accordance with one or more embodiments described herein, particularly where the network path analysis is for the first segment of the logical transaction path (e.g., from the first (left-side) set of servers to the load balancer). The sub-procedure 1500B may start at step 1535 (e.g., from step 1420 of FIG. 14 above), and continues to step 1540, where, as described in greater detail above, an originating transaction server 710 of the first set of transaction servers may be selected (e.g., selecting a particular port of the originating transaction server). In step 1545, a TCP traceroute may be initiated using SYN packets 1010 associated with the transaction application from the originating transaction server to the load balancer (e.g., ECMP aware), in order to determine, in step 1550, a network path of layer-3 segments between the originating transaction server and the load balancer, along with one or more network metrics associated with each layer-3 segment of the network path of layer-3 segments between the originating transaction server and the load balancer based on the TCP traceroute. The sub-procedure 1500B may then end in step 1555 (to return to step 1435 in FIG. 14, above).

It should be noted that certain steps within procedures 1400, 1500A, and 1500B may be optional as described above, and the steps shown in FIGS. 14-15B are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1500A and 1500B are described separately, certain steps from each procedure may be incorporated into each other procedure, or the procedures may both be performed as a full-picture scan of the logical application path, and the procedures are not meant to be mutually exclusive.

The techniques described herein, therefore, provide for deep network path analysis for identifying network segments affecting application performance. In particular, the techniques herein provide an automated technique to trace the network segments that are utilized by an application, and to gather network metrics specific to each particular segment. Such mechanisms are valuable for network visualization, troubleshooting, and root cause analysis, and produces fewer and more relevant deep path analysis incidents to solve a particular degradation occurrence. Current tools in the market rely on capturing the packets on the network and doing a time-based correlation with the application, i.e., they are not correlated to the specific business transactions, and cannot directly correlate network degradation path information to business transaction degradation path information. Other tools available in the market involve a lot of manual stitching together of data between the application and the network, thus leading to inaccuracies and increases in the mean-time to determine the root cause of the issue.

Furthermore, the techniques herein are capable of mapping network elements on both the left side and right side of a load balancer in east-west network traffic. In particular, though an agent on the left side of a load balancer can initiate synthetic traffic, the techniques herein also describe the detection of network elements on the load balancer's right side (e.g., the "real IP" side), by allowing an agent on the right side to piggyback synthetic traffic on existing application TCP ACK traffic. Notably, the techniques herein also includes provisions for handling ECMP routes in east-west traffic between two application services over which business transactions are exchanged (i.e., for mesh networks using ECMP load balancing methods).

In still further embodiments of the techniques herein, a business impact of network segments affecting application performance can also be quantified. That is, because of issues related to specific applications/processes (e.g., lost traffic, slower servers, overloaded network links, etc.), various corresponding business transactions may have been correspondingly affected for those applications/processes (e.g., online purchases were delayed, page visits were halted before fully loading, user satisfaction or dwell time decreased, etc.), while other processes (e.g., on other network segments or at other times) remain unaffected. The techniques herein, therefore, can correlate the isolated network segments and their network metrics with various business transactions in order to better understand the affect the network issues may have had on the business transactions, accordingly.

While there have been shown and described illustrative embodiments that provide for identifying network segments affecting application performance, it is to be understood that various other adaptations and modifications may be made within the spirit and scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any invention or of what may be claimed, but rather as descriptions of features that may be specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller", those skilled in the art will appreciate that agents of the application intelligence platform (e.g., application agents, network agents, language agents, etc.) may be considered to be extensions of the server (or controller) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, etc.), the techniques may be generally applied to any suitable software/hardware configuration (libraries, modules, etc.) as part of an apparatus or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:

determining, by a network analysis process executing on at least one processor, a trigger to initiate network path analysis for a transaction application operating over a logical transaction path having a first segment from a first set of transaction servers to a load balancer and a second segment from the load balancer to a second set of transaction servers, wherein the first set of transaction servers include left-side servers that originate traffic to the load balancer over the first segment, and the second set of transaction servers include right-side servers that receive traffic from the load balancer over the second segment;

determining, by the network analysis process, whether the trigger is based on the first segment or the second segment;

in response to determining that the trigger is based on the second segment, initiating the network path analysis, by the network analysis process in response to the trigger, wherein the network path analysis is for the second segment of the logical transaction path and comprises:

selecting a receiving transaction server of the second set of transaction servers;

identifying a transmission control protocol (TCP) session associated with the transaction application already in progress to the receiving transaction server;

initiating a TCP traceroute using acknowledgment (ACK) packets, whose signature matches the TCP session already in progress, from the receiving transaction server to the load balancer; and determining, in reverse, a network path of layer-3 segments between the receiving transaction server and the load balancer and one or more network metrics associated with each layer-3 segment of the network path based on the TCP traceroute; and identifying, by the network analysis process, one or more specific layer-3 segments of the network path causing performance degradation of the transaction application based on the network path analysis.

2. The method as in claim 1, wherein the network path analysis is for the first segment of the logical transaction path and comprises:

selecting an originating transaction server of the first set of transaction servers;

initiating a TCP traceroute using synchronize (SYN) packets associated with the transaction application from the originating transaction server to the load balancer; and determining a network path of layer-3 segments between the originating transaction server and the load balancer and one or more network metrics associated with each layer-3 segment of the network path of layer-3 segments between the originating transaction server and the load balancer based on the TCP traceroute; and wherein the method further comprises:

identifying one or more specific layer-3 segments of the network path of layer-3 segments between the originating transaction server and the load balancer causing performance degradation of the transaction application based on the network path analysis.

3. The method as in claim 1, wherein the trigger is the performance degradation of the transaction application surpassing a threshold tolerance of application-based latency.

4. The method as in claim 1, wherein the trigger is a user request.

5. The method as in claim 1, further comprising:

determining whether the performance degradation is based on either the first segment or the second segment.

6. The method as in claim 5, wherein the trigger is a user request and wherein determining whether the performance degradation is based on either the first segment or the second segment comprises:

receiving an indication within the user request of whether the performance degradation is based on either the first segment or the second segment.

7. The method as in claim 1, wherein the first set of transaction servers comprise ecommerce servers and the second set of transaction servers comprise order servers.

8. The method as in claim 1, wherein the one or more network metrics are selected from a group consisting of: latency; packet drops; delay; and jitter.

9. The method as in claim 1, wherein selecting the receiving transaction server of the second set of transaction servers further comprises:

selecting a particular port of the receiving transaction server.

10. The method as in claim 1, wherein the TCP traceroute is equal-cost multi-path (ECMP) aware.

11. The method as in claim 1, further comprising:

mitigating the performance degradation of the transaction application based on the one or more specific layer-3 segments causing the performance degradation.

12. The method as in claim 1, further comprising:

displaying the one or more specific layer-3 segments causing the performance degradation and the one or more network metrics associated with the one or more specific layer-3 segments causing the performance degradation on a graphical user interface (GUI).

13. The method as in claim 1, wherein determining the one or more network metrics associated with each layer-3 segment of the network path is based on subtracting previous total network metrics of a previous iteration of the TCP traceroute from a current total network metric associated with a current iteration of the TCP traceroute.

14. A tangible, non-transitory, computer-readable medium storing program instructions that cause a computer to execute a process comprising:

determining a trigger to initiate network path analysis for a transaction application operating over a logical transaction path having a first segment from a first set of transaction servers to a load balancer and a second segment from the load balancer to a second set of transaction servers, wherein the first set of transaction servers include left-side servers that originate traffic to the load balancer over the first segment, and the second set of transaction servers include right-side servers that receive traffic from the load balancer over the second segment;

determining whether the trigger is based on the first segment or the second segment;

in response to determining that the trigger is based on the second segment, initiating the network path analysis, in response to the trigger, wherein the network path analysis is for the second segment of the logical transaction path and comprises:

selecting a receiving transaction server of the second set of transaction servers;

identifying a transmission control protocol (TCP) session associated with the transaction application already in progress to the receiving transaction server;

initiating a TCP traceroute using acknowledgment (ACK) packets, whose signature matches the TCP session already in progress, from the receiving transaction server to the load balancer; and determining, in reverse, a network path of layer-3 segments between the receiving transaction server and the load balancer and one or more network metrics associated with each layer-3 segment of the network path based on the TCP traceroute; and identifying one or more specific layer-3 segments of the network path causing performance degradation of the transaction application based on the network path analysis.

15. The computer-readable medium as in claim 14, wherein the network path analysis is for the first segment of the logical transaction path and comprises:

selecting an originating transaction server of the first set of transaction servers;

initiating a TCP traceroute using synchronize (SYN) packets associated with the transaction application from the originating transaction server to the load balancer; and determining a network path of layer-3 segments between the originating transaction server and the load balancer and one or more network metrics associated with each layer-3 segment of the network path of layer-3 segments between the originating transaction server and the load balancer based on the TCP traceroute; and wherein the process further comprises:

identifying one or more specific layer-3 segments of the network path of layer-3 segments between the originating transaction server and the load balancer causing performance degradation of the transaction application based on the network path analysis.

16. The computer-readable medium as in claim 14, wherein the one or more network metrics are selected from a group consisting of: latency; packet drops; delay; and jitter.

17. The computer-readable medium as in claim 14, wherein the TCP traceroute is equal-cost multi-path (ECMP) aware.

18. The computer-readable medium as in claim 14, wherein the process further comprises:
  mitigating the performance degradation of the transaction application based on the one or more specific layer-3 segments causing the performance degradation.

19. The computer-readable medium as in claim 14, wherein the process further comprises:
  displaying the one or more specific layer-3 segments causing the performance degradation and the one or more network metrics associated with the one or more specific layer-3 segments causing the performance degradation on a graphical user interface (GUI).

20. An apparatus, comprising:
  one or more network interfaces to communicate with a network;
  a processor coupled to the network interfaces and configured to execute one or more processes; and
  a memory configured to store a process executable by the processor, the process when executed configured to:
    determine a trigger to initiate network path analysis for a transaction application operating over a logical transaction path having a first segment from a first set of transaction servers to a load balancer and a second segment from the load balancer to a second set of transaction servers, wherein the first set of transaction servers include left-side servers that originate traffic to the load balancer over the first segment, and the second set of transaction servers include right-side servers that receive traffic from the load balancer over the second segment;
    determine whether the trigger is based on the first segment or the second segment;
    in response to determining that the trigger is based on the second segment, initiate the network path analysis, in response to the trigger, wherein the network path analysis is for the second segment of the logical transaction path and comprises:
      selecting a receiving transaction server of the second set of transaction servers;
      identifying a transmission control protocol (TCP) session associated with the transaction application already in progress to the receiving transaction server;
      initiating a TCP traceroute using acknowledgment (ACK) packets, whose signature matches the TCP session already in progress, from the receiving transaction server to the load balancer; and
      determining, in reverse, a network path of layer-3 segments between the receiving transaction server and the load balancer and one or more network metrics associated with each layer-3 segment of the network path based on the TCP traceroute; and
    identify one or more specific layer-3 segments of the network path causing performance degradation of the transaction application based on the network path analysis.

* * * * *